(12) United States Patent
Ghanadan et al.

(10) Patent No.: US 8,976,728 B2
(45) Date of Patent: *Mar. 10, 2015

(54) DISTRIBUTED MEDIUM ACCESS CONTROL (DMAC) FOR MOBILE AD HOC NETWORKS

(75) Inventors: Reza Ghanadan, Berkeley Heights, NJ (US); Jessica Hsu, Washington, DC (US); Ming Luo, Fairfax, VA (US); Shaomin Mo, Montville, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 936 days.

This patent is subject to a terminal disclaimer.

(21) Appl. No.: 12/587,615

(22) Filed: Oct. 10, 2009

(65) Prior Publication Data

US 2010/0124207 A1    May 20, 2010

Related U.S. Application Data

(63) Continuation-in-part of application No. 12/386,107, filed on Apr. 14, 2009, now Pat. No. 8,284,738.

(60) Provisional application No. 61/199,341, filed on Nov. 14, 2008, provisional application No. 61/199,343, filed on Nov. 14, 2008.

(51) Int. Cl.
*H04W 4/00* (2009.01)
*H04J 3/00* (2006.01)
*H04W 74/02* (2009.01)

(52) U.S. Cl.
CPC .................................. *H04W 74/02* (2013.01)
USPC ........................................ 370/328; 370/336

(58) Field of Classification Search
USPC ....................................................... 370/336
See application file for complete search history.

(56) References Cited

U.S. PATENT DOCUMENTS

| 6,631,124 | B1* | 10/2003 | Koorapaty et al. ........... 370/337 |
| 6,798,761 | B2 | 9/2004 | Cain et al. |
| 6,996,061 | B2 | 2/2006 | Yang et al. |
| 7,304,972 | B2 | 12/2007 | Cain et al. |
| 2001/0019542 | A1 | 9/2001 | Diachina et al. |
| 2005/0020299 | A1 | 1/2005 | Malone et al. |
| 2008/0089311 | A1 | 4/2008 | Roy et al. |
| 2008/0316966 | A1* | 12/2008 | Joshi et al. .................... 370/330 |

OTHER PUBLICATIONS

K. Xu, et al., How Effective is the IEEE 802.11 RTS/CTS Handshake in Ad Hoc Networks?, University of California, Los Angeles, Computer Science Department, on-line publication (undated).

\* cited by examiner

*Primary Examiner* — Chirag Shah
*Assistant Examiner* — Majid Esmaeilian
(74) *Attorney, Agent, or Firm* — Leo Zucker

(57) ABSTRACT

Message or traffic data is transmitted from a given radio or node for reception by one or more other nodes in a communications network, by arranging the node for transmitting the data according to a selected one of a number of different medium access protocols. The medium access protocol selected for a given message or traffic is determined according to one or more of (a) the size of the traffic, (b) the priority of the traffic, (c) the periodicity of the traffic, and (d) whether the traffic is broadcast or unicast to the other nodes in the network. Each radio includes one or more processor and memory modules configured to output messages or traffic for transmission from the radio according to the selected medium access protocol. By using distributed scheduling and traffic control to protect against hidden nodes, the radios can maintain agile portability in tactical urban environments.

9 Claims, 17 Drawing Sheets

DISTRIBUTED MEDIUM ACCESS CONTROL (DMAC) FOR MOBILE AD HOC NETWORKS

CROSS REFERENCE TO RELATED APPLICATIONS

This application claims priority under 35 U.S.C. §119(e) of U.S. Provisional Patent Applications No. 61/199,341 filed Nov. 14, 2008, and titled "Distributed Adaptive Scheduling Over Hyperarcs (DASH) Algorithm for Mobile Ad Hoc Networks", and No. 61/199,343 also filed Nov. 14, 2008, and titled "Distributed Media Access Control (DMAC) for Mobile Ad Hoc Networks". Both of the mentioned '341 and '343 applications are incorporated by reference.

The present application is also a continuation-in-part (CIP) of co-pending U.S. Utility patent application Ser. No. 12/386,107 filed Apr. 14, 2009 now U.S. Pat. No. 8,284,738, and titled "Distributed Adaptive Scheduling of Communications Among Nodes in a Mobile Ad Hoc Network".

BACKGROUND OF THE INVENTION

1. Field of the Invention

The present invention relates to a protocol for enabling radios or nodes to acquire access for transmissions in a mobile communications network.

2. Discussion of the Known Art

The recent shift toward isolated urban military warfare emphasizes the need for rapidly deployable, multihop tactical networks. Due to inherent characteristics of wireless signals, simultaneous transmissions of voice or other communications are usually difficult to implement over multiple hops without costly hardware and/or a network controller, however. And because typical military handheld radios are usually in the form of single channel, half-duplex transceivers due to size, weight and power (SWAP) considerations, the radios have limited if any capability to coordinate simultaneous communications within a given network. While a central base station like one defined in IEEE Standard §802.16 or used in commercial cellular networks could provide such coordination, the base station would become vulnerable as a single point of failure.

Existing mobile ad hoc networks (MANET) may also rely on known static time domain multiple access (TDMA) schemes such as Link 16 to carry out simultaneous communications. Static TDMA networks are typically pre-planned and are not adaptive, and require certain critical network nodes that add to network vulnerability, however.

MANETs can also deploy a carrier sense multiple access/collision avoidance (CSMA/CA) protocol including a request-to-send/clear-to-send (RTS/CTS) mode, to avoid so-called hidden node situations wherein two radios outside of hearing range (i.e., hidden) from one another attempt to transmit data packets at the same time. See, e.g., IEEE Standard §802.11. Without RTS/CTS, a receiver within range of two hidden transmitting nodes would receive sets of collided packets and thus be unable to decode packets as originally transmitted from either radio. RTS/CTS generates additional overhead and unnecessarily limits channel traffic only to unicast messages, however. Yet, unless some form of scheduling or coordination is used in a MANET, packet collisions are inevitable.

Changes in Combat Environment

As mentioned, recent surges in urban warfare highlight the importance of small, multiple hop networks capable of operation while isolated from outside communications. Hostile urban environments are fraught with physical obstacles that impede or block radio communications. Buildings, walls, and existing communication infrastructures, all cause significant amounts of interference. Because situational awareness is a key factor toward decision making in such environments, it is especially important that reliable, high speed communications among ground infantry personnel be maintained should they become locally isolated. Multimedia information including voice, video, and other critical data must be disseminated rapidly and reliably as necessary during tactical missions.

Current hardware technologies make it difficult to provide troops with affordable, long-range personal radios capable of maintaining connectivity in hostile urban environments without being physically large in size and unwieldy. It would therefore be desirable if available, relatively inexpensive portable short-range radios that currently lack multi-hop capability can be, upgraded at minimal cost with the capability to coordinate communications over more than one hop. Such radios would allow individual soldiers to maintain connectivity with one another while staying highly mobile during tactical operations in urban environments.

SUMMARY OF THE INVENTION

According to the invention, a method of transmitting information or data from a given radio or node for reception by one or more other nodes in a communications network, includes arranging the node for transmitting messages or traffic according to a selected one of a number of different medium access protocols, and selecting one of the access protocols for transmitting a given message or traffic according to one or more of (a) the size of the traffic, (b) the priority of the traffic, (c) the periodicity of the traffic, and (d) whether the traffic is broadcast or unicast to the other nodes in the network.

According to another aspect of the invention, a radio includes, a first network layer constructed and arranged for transmitting and receiving messages or traffic to and from other radios or nodes in a communications network, and a second network layer including one or more processor and memory modules configured to output messages or traffic to the first network layer for transmission from the radio according to a selected one of a number of different medium access protocols. The access protocol selected for a given message or traffic is determined according to one or more of (a) the size of the traffic, (b) the priority of the traffic, (c) the periodicity of the traffic, and (d) whether the traffic is broadcast or unicast to the other radios in the network.

For a better understanding of the invention, reference is made to the following description taken in conjunction with the accompanying drawing and the appended claims.

DETAILED DESCRIPTION OF THE INVENTION

Figure 1:
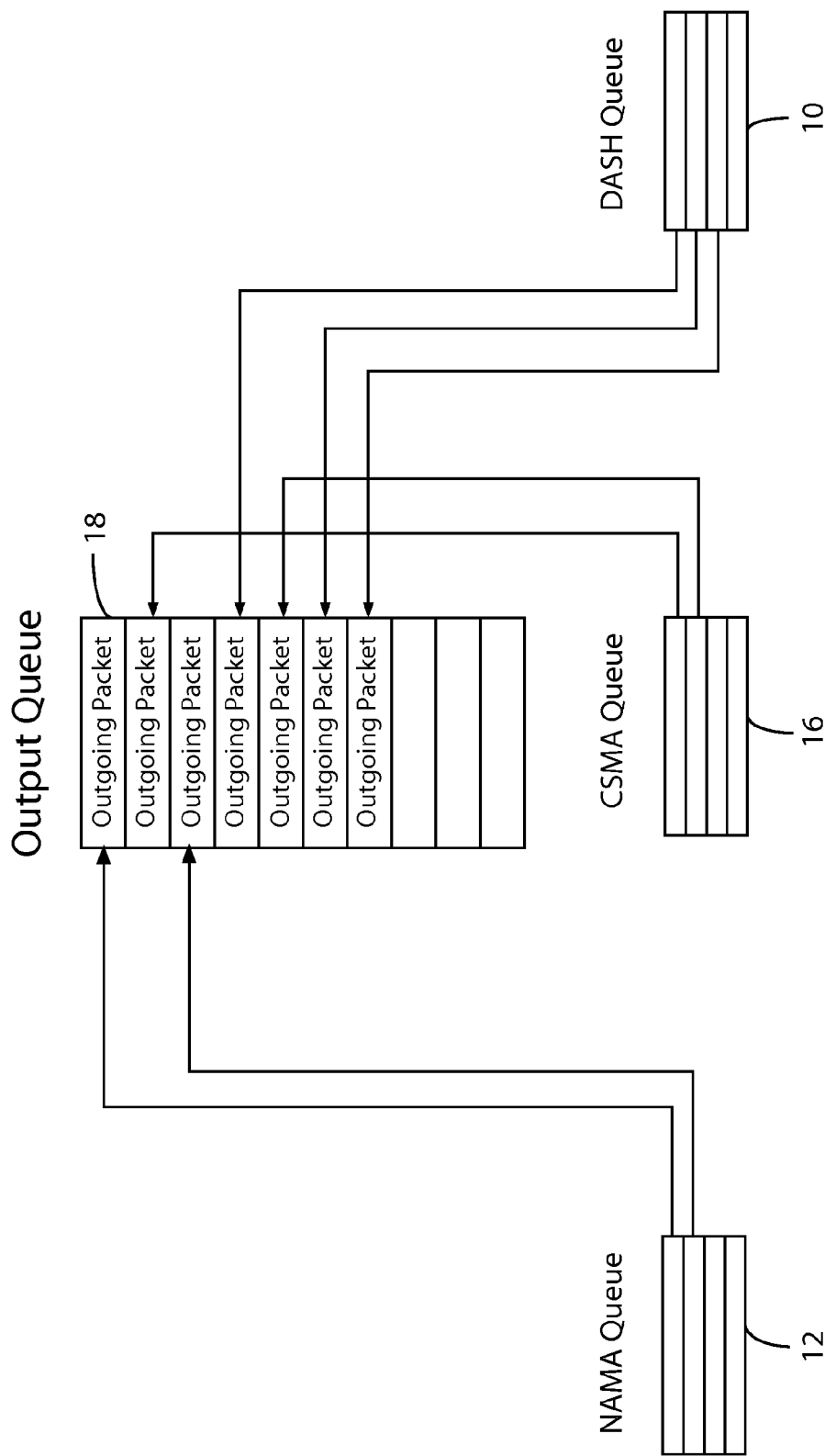
FIG. 1 is a block diagram of a queue architecture for a distributed adaptive scheduling over hyperarcs (DASH) protocol suitable for use as part of a distributed medium access control (DMAC) protocol according to the invention.

As noted above, traffic coordination is a constant challenge in mobile ad-hoc networks (MANET). Node topologies and propagation conditions are likely to change continuously, making reliable wireless communications difficult to initiate and maintain. Adaptive transmission scheduling would therefore reduce or eliminate potential errors arising from packet collisions. The inventive protocol, referred to herein as Distributed Medium Access Control or DMAC, enables transmissions from individual radios to be scheduled on a distributed basis with minimal hardware requirements and low network overhead.

The DMAC Protocol

DMAC is a hybridized TDMA type of medium access protocol especially suited for implementation in single-channel, half-duplex radios, i.e., radios that transmit communication signals on a given frequency or channel, and receive signals on the same channel while not actively transmitting. The SWAP for the radios is kept at a minimum to facilitate easy transport and storage by their users.

Basically, DMAC separates and prioritizes different types of traffic or message data so that each type of data is serviced for transmission from a given radio at an optimal time. For example, broadcast and multicast streaming traffic, which may be critical in supporting activities of soldiers in new tactical deployments, are given highest priority. In the disclosed embodiment, DMAC integrates three protocols to accommodate the different types of messages and obtain optimal overall performance.

DMAC also allows for important network maintenance by providing specific hooks for delivery of network control messages, topology control messages, route creation and maintenance messages, and network entry. Overhead is carefully controlled so that network performance is not greatly affected by the implementation of the protocol.

While specific data or message types are accommodated by DMAC, the ability of the protocol to handle other types of messages is not limited. For example, in the absence of specific instructions for a given data packet, DMAC simply attempts to deliver the message without conflict. Three types of traffic or message data recognized in the present embodiment of DMAC, are:

1. High volume streaming data: Multimedia streams, voice, and high rate data streams.
2. Sporadic messages: Small, unscheduled bursts of data.
3. Low volume periodic streams: Network maintenance and control messages.

The above message types are serviced by DMAC using the following channel access protocols:

1. Scheduled TDMA: A TDMA protocol that provides evenly distributed deterministic access for network members based on a member's node ID such as, e.g., a node access multiple access (NAMA) protocol described below.
2. Reserved slots: A reservation protocol such as, e.g., a distributed adaptive scheduling over hyperarcs (DASH) protocol described below in connection with FIGS. 1 to 6.
3. Contention access: Contention using CSMA/CA for fast access. Traffic transmitted under CSMA/CA is kept to a minimum to reduce chances of packet collisions.

To implement DMAC with best results, each network radio should preferably have the following capabilities:

1. Time synchronization: Accurate to a minimum of 10% of the length of a single time slot.
2. Neighborhood (topology) awareness: Knowledge of other radios or nodes within at least two hops of the given radio, and of routes to other nodes in the network.

When implemented, DMAC allows the radio to communicate in multiple hop scenarios without the detriment of hidden terminals or excessive network overhead. The protocol is also scalable to support relatively large networks of nodes.

Scheduling Capabilities

In the present embodiment, DMAC uses two main scheduling services to arrange for future transmissions, viz., the mentioned NAMA and DASH protocols. When outgoing data packets arrive for transmission, DMAC puts them into separate queues according to the transmission process to be followed for each packet, i.e., NAMA, DASH, or Contention. The queuing decision is based on current transmission conditions, packet type, queue sizes, and other factors. When the time arrives for a radio to transmit, the radio dequeues from the appropriate queue and starts transmission.

Specifically, NAMA is a TDMA protocol that uses a deterministic hash to define which node in the network is allowed to transmit during a given time slot. Using its hash, NAMA generates a priority value for each node using a unique node ID and a current time slot number as inputs. By running the hash on all two hop neighbors of a given radio and giving transmission priority to the radio with the highest determined priority, NAMA provides protection from hidden node scenarios assuming accurate topology information has been obtained. Being repeatable, the hash is also useful for minimizing coordination overhead since an entire network of users will all arrive at the same decision without having to exchange data every time slot.

Also as disclosed below, DASH is a scheduling protocol that uses NAK-based negotiations to reserve portions of a defined network time frame for future transmissions. Reservations are made on a nonpermanent basis in order to prevent starvation within the system, and to remove complications of coordinating the release of active reservations. In order to amortize the cost of the negotiations, reservations are made effective for relatively long periods of time. And to prevent the loss of active reservation requests, the DASH reservation process utilizes NAMA transmission slots to prevent unnecessary packet collisions.

The NAMA, the DASH and the CSMA/CA channel access protocols are used opportunistically in DMAC to obtain greatest efficiency. For example, since DASH is adept at reserving large portions of bandwidth, high volume traffic is transmitted using the DASH protocol. On the other hand, because NAMA is better suited to distribute bandwidth amounts evenly among the network nodes, NAMA is used for transmission of periodic network maintenance messages.

The DASH Protocol (FIGS. 1 to 6)

DASH is an adaptive scheduling protocol that enables a given node in a wireless mobile network to reserve a set of time slots during which it may transmit a desired traffic load without interference from hidden terminals or other nodes not sensed initially by the reserving node. The protocol can be implemented to cooperate with complementary protocols that handle more sporadic or transient network traffic, including the inventive DMAC protocol.

To allow for unevenly distributed traffic loads, DASH does not restrict or throttle the ability of a node to access available channel bandwidth. Any initial cost in overhead needed to implement the reservation process, is amortized over time due to the quasi-permanent nature of the data flows serviced by DASH. By decentralizing the reservation process, DASH enables a wireless mobile network to manage traffic without the need for a centralized control node that has the potential of becoming a single point of network failure.

Schedule Maintenance

Communications within wireless mobile networks frequently suffer from certain effects due to the changing topologies of their member nodes. The DASH protocol therefore distributes updated scheduling messages continuously among the nodes of a mobile network to ensure that conflicting transmission schedules will be avoided in a given transmission area. Relatively small sized slot schedule maps (referred to herein as Bit Illustrated Maps or BIMs) are communicated among the nodes during unscheduled time slots. Each map represents a snapshot of a defined reservation frame as seen by the node that transmits the BIM, and is preferably in the form of, e.g., a string of bits wherein 1's represent slots that are reserved, and 0's represent slots that are free, i.e., slots available for transmissions that receiving nodes may want to send in the future. Assuming, for example, that a given network frame contains several hundred time slots that may be reserved, each BIM need only be several hundred bits long thus making the cost of distributing BIMs fairly insignificant.

To facilitate protection from hidden terminal scenarios, different kinds of BIM tables are maintained and updated at each node. For example, each node maintains a BIM table that contains only "personal" reservations made by the node itself, and reservations that were overheard or personally witnessed by the node. A Local BIM (LBIM) table identifies the owner of the reservation in a particular slot. An Extended BIM (EBIM) table containing BIM updates from neighboring nodes, is also maintained. When a node transmits a BIM update, it sends only its own LBIM, and keeps its EBIM table as a local variable that may be updated internally with each BIM refresh.

In addition to the mentioned BIM tables, each node keeps track of the last time a reserved slot entered in its LBIM table was actually used. This may be done, for example, simply by using an internal Last Usage (LU) table for upkeep and deallocation of current reservations.

Reservations

When a node desires to reserve a certain number of time slots to transmit a given traffic load, the node transmits the request (referred to herein as a Reservation Initiation Message or RIM) during currently unused time slots to reserve its desired slots (for a certain duration of time.) The duration is preferably configurable, and may be set to whatever is convenient. Active reservations and reservations in progress are kept in separate tables for management and reference. To avoid interfering with neighboring nodes who may also be attempting to request reservations, a requesting node may use, e.g., a simple CSMA algorithm with a known distributed coordination function (DCF) for collision avoidance, and thus minimize network overhead.

The contents of the RIM message preferably include:

1. Reservation BIM (RBIM) which identifies the newly requested time slots. The requested slots may be selected randomly from among those marked as free in the requesting node's LBIM and EBIM.

2. Proposed Start Time (PST) which is set to a time far enough ahead to allow neighboring nodes sufficient time to update their LBIM tables, or to send back a Conflict RIM (CRIM) (see below) if a scheduling conflict exists.

3. Proposed End Time (PET) which is set to a time beyond the PST and which concludes the duration of the requested reservation.

4. RIM ID. This is a unique message ID that may comprise, e.g., 32 bits.

When a node receives a RIM message, it examines the included RBIM (the newly requested time slots) and decides if a conflict exists with any other active reservations or RIMs in progress. If there are no conflicts, the receiving node puts the RIM's proposed reservation slots in a temporary buffer while it awaits the PST included in the RIM. If there is a conflict, the receiving node generates a CRIM to respond to the node that transmitted the RIM. The GRIM contains the RIM ID of the offending RIM, and a revised RBIM identifying only the conflicting slots. When the node that transmitted the initial RIM receives the GRIM, it generates another RIM with the same RIM ID so as effectively to amend the RIM currently in progress. The PST and the PET need not change throughout the negotiation process.

The foregoing conflict negotiation repeats until the node that transmitted the initial RIM ceases to receive CRIMs, or the PST arrives. When a RIM's PST arrives, both the node that transmitted the initial RIM and all nodes that received it assume the RIM in question has completed as proposed. All nodes then update their BIM and LBIM tables to reflect these changes.

Slot Maintenance

When an active reservation's PET arrives, the corresponding time slots are marked as free in the BIM and LBIM tables, and the slots will be available for future reservations.

Preferably, nodes within the network periodically send out updates of their BIM, so that other nodes can determine if any conflicts exist within their local transmission area.

As summarized above, the DASH protocol maintains a number of resources locally at each node. These resources and their operation are defined further below.

DASH Data Structures

Schedule Maps

BIM (Bit Illustrated Map): A map of a defined frame (or sub-frame) of time slots, wherein slots reserved for future transmissions and unreserved slots are each identified as such. A BIM is a local variable unique to each network node, and may be in the form of a string of bits each of which corresponds to a different slot in the frame. For example, the position of each bit in the string may correspond to the position of the slot that the bit represents in the frame, wherein a "1" bit represents an existing reservation for the corresponding slot, and a "0" bit represents no known reservation for the slot. Each node's BIM is saved as a local variable. Note that the BIM contains only reservations that the node itself has actively made, or heard being made by other nodes.

LBIM (Local Bit Illustrated Map): A map frame that identifies a particular node that made a reservation for a given slot. A LBIM differs from a BIM in that it comprises an array of characters whose indices correspond to slot positions in a frame, together with the ID of the node that reserved the slot(s). Thus, the LBIM may be used in conjunction with the BIM to determine who is expected to transmit within a reserved frame. Note that the LBIM contains the local node's own reservations in addition to any RIM negotiations (see below) it overheard or took an active part in making.

EBIM (Extended Bit Illustrated Map): A BIM that covers up to two hops by gathering up overheard BIM updates. An EBIM is a bitwise combination of BIM updates from one hop neighbors of the local node. This data is preferably kept updated for changes in reservations. Note that if BIM updates are transmitted during time slots obtained via a known complementary Node Activated Multiple Access (NAMA) protocol, then two EBIMs are maintained; namely, an EBIM that contains updates from the BIM updates during a current frame, and an EBIM that contains the BIM updates from the previous frame. The DASH reservation process preferably uses the EBIM that contains BIM updates from the previous frame. The EBIM that is updated from BIM updates during the current frame iteration simply creates a completed EBIM for use in the next frame iteration. The NAMA protocol is disclosed in a published article by L. Bao, et al., titled "Distributed dynamic channel access scheduling for ad hoc networks", Journal of Parallel and Distributed Computing, vol. 63, issue 1 (January 2003) at pages 12-13. All relevant portions of the mentioned Bao, et al. article are incorporated by reference.

Note also that the BIM is the only kind of map a node actually needs to send to other nodes, and the map may be transmitted during a determined time slot as a BIM update. Assuming slot sizes are spaced for 500 byte packets, the size of the BIM would be as in Table 1:

TABLE 1

BIM size

| Frame Size (in time slots) | BIM Size (in bytes) |
|---|---|
| 2750 | 344 |
| 2000 | 250 |
| 1500 | 188 |
| 1000 | 125 |
| 500 | 63 |

Reservation Table

A reservation table is a two dimensional array that contains information concerning reservations that have already been made. The table may contain detailed information about the reserved slots within the BIM, and it preferably includes the following information:

1. Start time: A clock tick representing the point in time at which the reservation was first initiated.
2. Expiration time: The clock tick when the reservation will expire and have to be removed.
3. Slots Reserved: A bit illustrated map that shows which slots are reserved.

RIM Table

A Reservation Initiation Message (RIM) table that keeps track of reservations that are in process. The table is saved at each node as a two dimensional array and preferably includes the following information:

1. Reservation BIM: A BIM that specifies which slots are being reserved.
2. Proposed Start Time: A certain time in the future when the RIM will activate into an actual reservation.
3. Proposed End Time: A time in the future when the RIM will expire.
4. RIM ID: A unique, e.g., 32 bit ID that corresponds to the RIM.
5. Reserver ID: The ID of the reserving node.

Queues

In one preferred embodiment, the DASH protocol accesses and links itself to three transmission queues (see FIG. 1) that are implemented at each node under the inventive DMAC protocol as explained later below. The queues include;

DASH queue 10: A DMAC transmission buffer that DASH must service. While the DASH queue 10 is not directly manipulated under the DASH protocol, the DASH queue is preferably checked to determine whether or not a number of reservations made under DASH should be increased.

NAMA queue 12: A DMAC defined queue that is also not directly manipulated by DASH. The BIM generated by DASH is set at the beginning of every NAMA queue 12. As implied, this never causes a new NAMA Queue entry to be created.

CSMA queue 16: A CSMA Queue is used for transmission of Dash Control Messages (DCMs). Note that when the present specification refers to the addition of an item to the "CSMA queue", the subject message is actually added to a DMAC defined Output Queue 18 in FIG. 1, and a link to the message is the item that is added to the CSMA queue 16.

Figure 2:
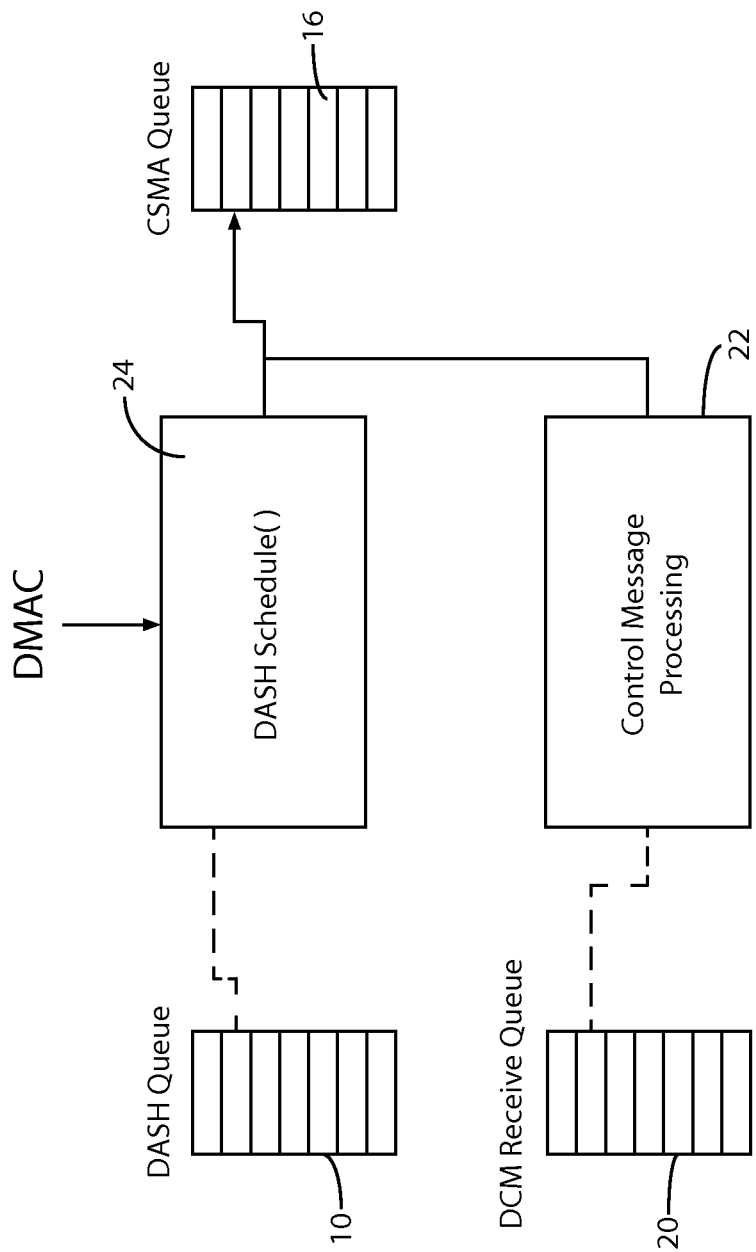
FIG. 2 is a block diagram illustrating a processing architecture for the DASH protocol.

In addition, as shown in FIG. 2, the DASH protocol defines its own Dash Control Message (DCM) receive queue 20 which is, e.g., a FIFO queue that stores received DCM messages until the messages are examined by a Control Message Processing Module 22. The DCM messages include the RIM, the CRIM, and the BIM messages described above.

DASH Functionality

As shown in FIG. 2, the functionality of the DASH protocol may be described in terms of two main processing modules, namely;

1. Control Message Processing 22: This process runs independently of the transmission of DCMs and the interface with the DMAC protocol. The processing includes receiving incoming DCMs in the receive queue 20 at each node, and, if necessary, placing responsive messages into the CSMA queue 16 for transmission.
2. DASH_Schedule( ) 24: This process interacts with the DMAC protocol and the DASH queue 10 to determine a number of reservations to be made (e.g., per DASH reservation methodology, described further below) to satisfy current demands. The process also maintains the Reservation Table at each node.

FIG. 2 also shows how the processes combine to form a software structure for the DASH protocol. In FIG. 2, the only invocation to the DASH process structure is a call by the DMAC protocol to DASH_Schedule( ) 24.

DASH Reservation Methodology

Figure 3:
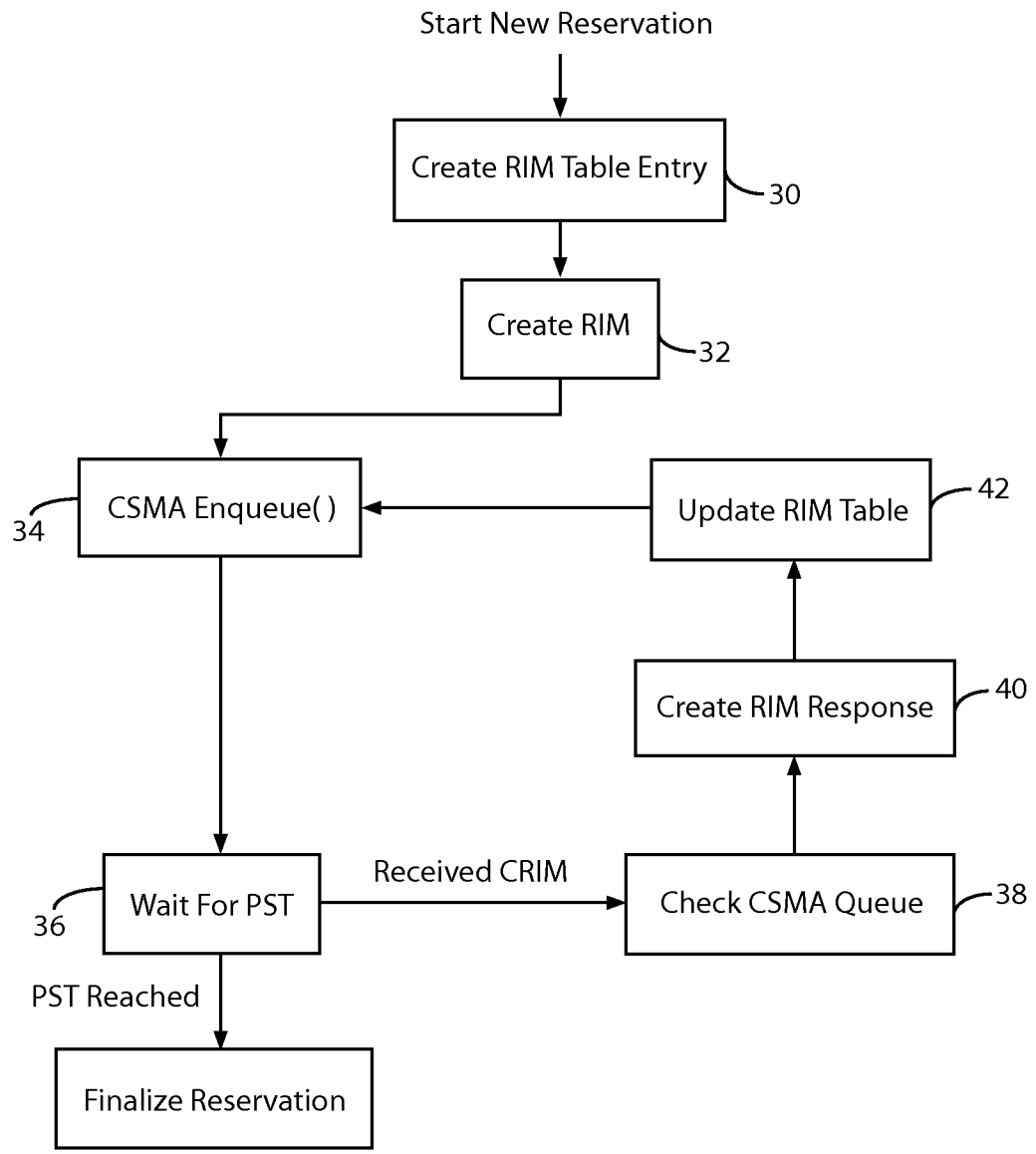
FIG. 3 is a block diagram showing steps of the protocol by which a node initiates a slot reservation process and transmits a reservation initiation message (RIM)

FIG. 3 is a block diagram that illustrates the DASH reservation process wherein a reserving node, referred to below as a RIM transmitter, initiates a new reservation for a sufficient number of time slots to send a desired traffic load or message. As noted earlier, DASH uses two types of messages to make reservations, namely;

1. A Reservation Initiation Message (RIM) containing:
    a. Reservation BIM (RBIM)—the newly requested slots which the RIM transmitter may have selected randomly from known available free slots (i.e., those slots marked as free in the BIM and the EBIM tables at the transmitter).
    b. Proposed Start Time (PST)—set, for example, to one second in the future from the moment the RIM message is transmitted.
    c. Proposed End Time (PET)—set, e.g., to ten seconds after of the PST.
    d. RIM ID—a unique (e.g., 32 bit) ID for the current RIM session.

Note that a RIM message is always sent by a RIM transmitter, i.e., the node that is initiating a reservation for itself. Also note that the time intervals stated in b. and c. above may vary depending on network parameters such as transmission speed, slot size, frame size, and the like.

2. A Counter Reservation Initiation Message (GRIM) containing:
    a. Free BIM (FBIM)—a bit illustrated map that contains a map of slots known by the GRIM sending node as being available.
    b. PST—this is updated to a time appropriate to account for the delay of the RIM.
    c. PET—this is likewise updated to a time appropriate to account for the delay of the RIM.
    d. RIM ID—the ID of the RIM message to which the current GRIM message is responding.

Figure 4:
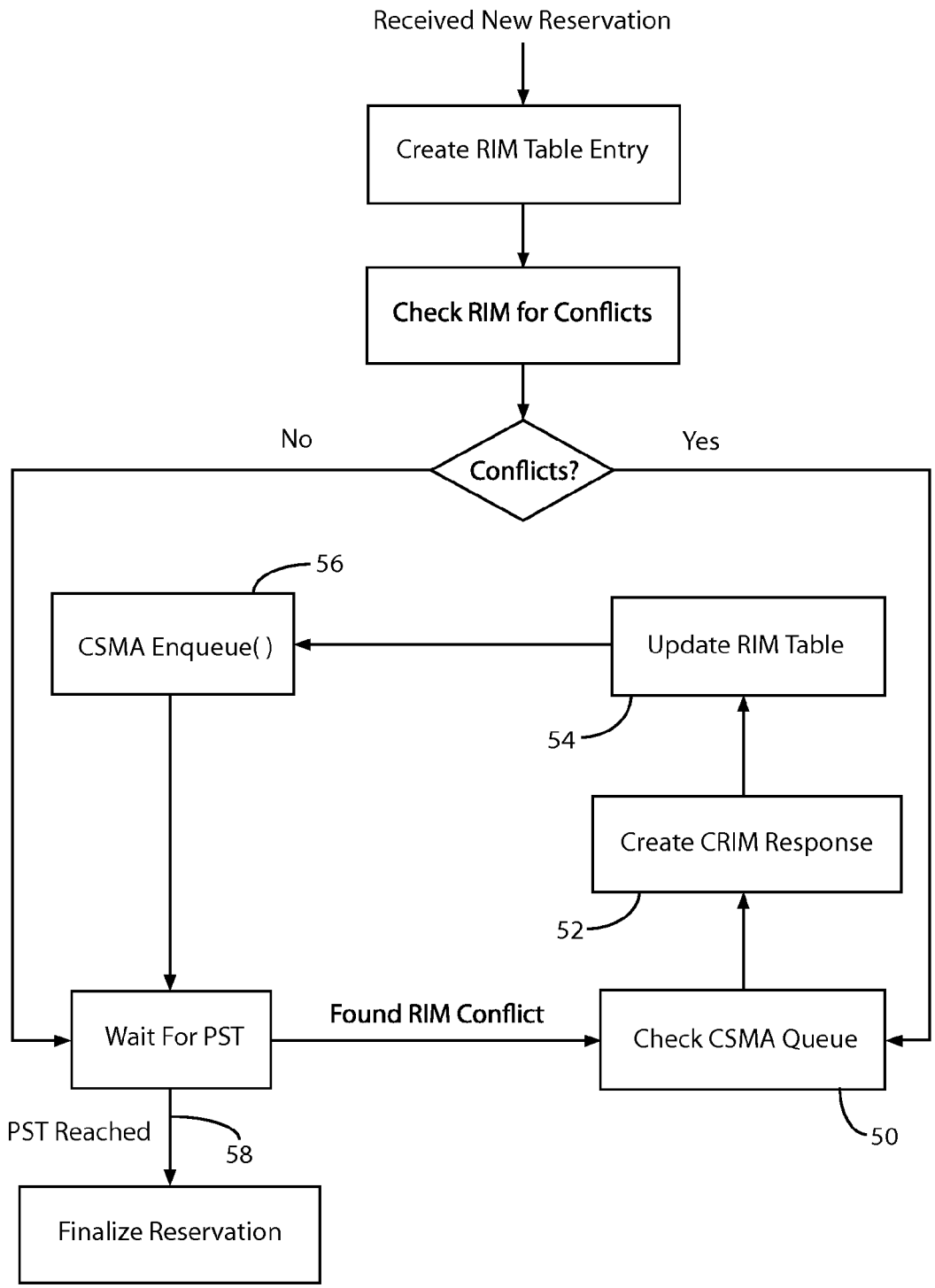
FIG. 4 is a block diagram showing steps followed by a node that receives a RIM and, if necessary, transmits a counter reservation initiation message (CRIM) in response to the RIM according to the protocol.

Note that CRIM messages are sent exclusively by RIM receiver nodes (see FIG. 4). When a GRIM is used, the PST and PET times should be updated to give the reservation process enough time to exchange any additional messages to negotiate the current scheduling conflict. Any change in the PST and the PET times should be recorded in the RIM Table as well.

Since this is a best attempt reservation negotiation, it is not necessary to account for timeouts for RIM messages. If the RIM messages are not countered with a GRIM, they will simply become committed to the BIM tables of any affected nodes when the PST for the messages arrives.

As described above, a typical reservation process under DASH will proceed as follows.
1. A RIM transmitter node transmits a RIM message to initiate a reservation for a certain number of time slots.
2. All nodes in range (one hop RIM receivers) are allowed the option of sending a GRIM in reply if a scheduling conflict is determined to exist at any of the receiving nodes.
3. If a CRIM is received by the RIM transmitter, the included Free BIM information is used to generate a new RIM, and step 1. above is repeated by the RIM transmitter until no GRIM is received.

Thus, a RIM transmitter initiates a reservation by sending an initial RIM message, and any successive RIM messages necessary to complete the reservation process. FIG. 3 illustrates a number of steps the transmitter may take when preparing its RIM transmissions and when receiving CRIM messages.

In FIG. 3, the RIM transmitter makes an initial RIM transmission by creating a RIM Table entry 30 for a new reservation, and sending out a corresponding RIM 32 by queuing the message into, for example, an output or CSMA enqueue 34. At 36, the node awaits the arrival of the PST that was set in the initial RIM transmission. The PST is stored in the node's own RIM table, and is updated and refreshed each time a CRIM including the same RIM ID is received.

Upon reception of a GRIM message, the RIM transmitter performs the following steps:
    a. Check CSMA queue 38—the RIM transmitter checks if there is a RIM message already in flight with the same RIM ID. If so, it pulls the message from the CSMA enqueue 34 and saves the RBIM contained within. If not, it continues to create RIM response 40.
    b. Create RIM response 40—the RIM transmitter uses the RBIM saved from check CSMA queue 38 and the FBIM in the newly received CRIM, to create a new RIM.
    c. Update RIM table 42—the RIM transmitter updates the table entry for the newly created RIM.
    d. CSMA_enqueue( ) 34—the RIM transmitter enters the newly created RIM into the Output queue 18 in FIG. 1 and adds a corresponding link to this entry—to its CSMA queue 16 (FIG. 2).

Once the PST is reached without interruption (at 34), the new reservation is committed to the Reservation table and the corresponding RIM table entry is deleted.

RIM receivers are defined as network nodes that are within receiving (one hop) range of a RIM transmitter. As illustrated in FIG. 4, a RIM receiver is configured to transmit a CRIM message if it determines that a potential conflict in slot usage exists, thus avoiding the mentioned hidden terminal situation. The RIM receiver's actions may be implemented in the control message processing module 22 in FIG. 2.

Specifically, upon its initial reception of a RIM message, a RIM receiver determines if the BIM contained in the message presents any conflict with slots already marked as reserved in the receiver's own BIM. If not, the receiver waits for the PST to arrive. If a conflict is determined, however, the receiver initiates a CRIM message in response, as follows:
    a. Check CSMA queue 50—the receiver checks if a CRIM message having the same RIM ID is already in flight. If so, the receiver pulls this CRIM message from the CSMA queue 16. If not, the receiver continues to Create RIM response 52.
    b. Create RIM response 52—referring to its own BIM, the receiver creates a new CRIM.
    c. Update RIM table 54—the receiver updates the table entry for the newly created CRIM.
    d. CSMA_enqueue( ) 56—the receiver enters the newly created CRIM into the Output queue 18 in FIG. 1, and then adds a link to this entry to the CSMA queue 16.

When the PST is reached without interruption (at 58), the receiver commits the new reservation to its Reservation table and the corresponding RIM table entry is deleted.

Periodic updates are preferably sent by each network nodes to notify nodes of the contents of the sending node's BIM. When hearing these updates, the surrounding nodes can then generate or refresh their own EBIM tables.

DASH Schedule

Figure 5:
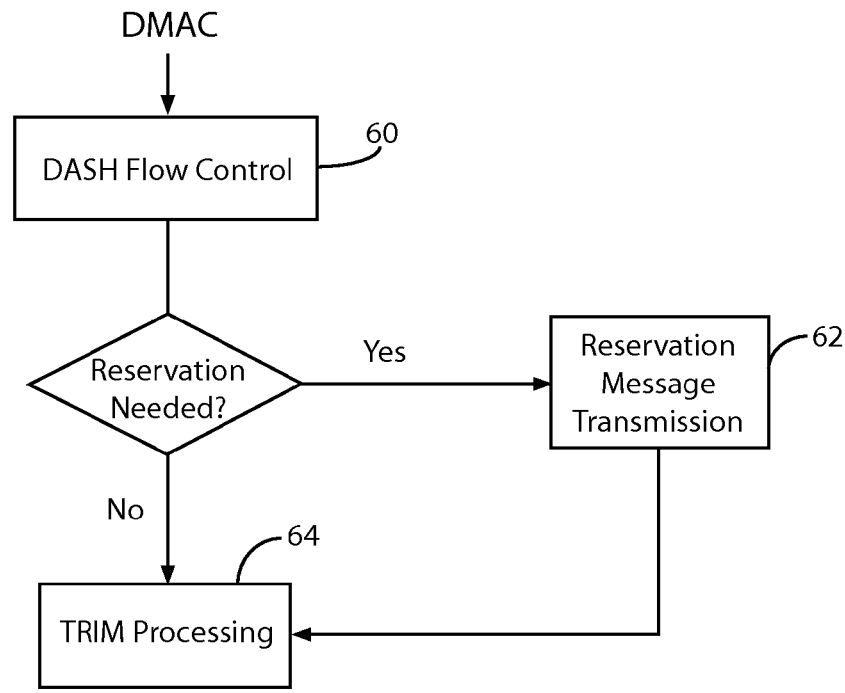
FIG. 5 is a block diagram of an interface between the DASH protocol and a complementary network operating protocol.

As shown in FIG. 2, DASH_schedule( ) 24 is a process that may be called by DMAC or other complementary protocol operating in the network. When called, DASH_schedule( ) 24 evaluates whether or not new reservations are necessary. FIG. 5 shows an example of such an interface between the DASH and the DMAC protocols.

In FIG. 5, DASH flow control 60 determines if a current number of reservations is sufficient to handle a currently pending transmission load waiting in the DASH queue 10 in FIGS. 1 and 2. The determination may be based on the number of messages in the DASH queue 10, and whether or not it is possible for the messages to be transmitted over the duration of a frame given the number of reservations currently made. The number of current reservations also includes reservations in progress (located in the RIM Table). If this is not possible, the number of slots required is sent to the reservation message transmission process 62, which operates to obtain the needed slots. If DASH flow control 60 determines there is an excess of reservations for the current traffic load, it refrains from sending additional RIM messages since the current reservations will eventually expire and thus leave their associated slots open for future reservations.

DASH flow control 60 may attempt further reservations as long as it judges that additional bandwidth is required, and there are sufficient slots that remain unreserved. A cut-off at which further reservations are not allowed may be defined, for example, at a 90% reservation load. A certain number, for example, ten percent of total DASH-accessible slots should remain unreserved so that DCMs and other important messages can always be transmitted. The cut-off value may also vary depending on various network conditions and circumstances.

When DASH flow control 60 decides to make a reservation, it calls the reservation message transmission process 62 which in turn maintains a link to the RIM that it just placed into the CSMA queue 16 in FIGS. 1 and 2. If a new reservation is needed before the existing RIM is actually transmitted, the reservation message transmission process 62 amends the new slots needed in the existing message. This prevents any unnecessary messages from being transmitted.

A TRIM processing module 64 is configured to check the reservation table to determine if any changes should be made to the BIM due to reservation expirations. If there are any expired reservations, the module 64 updates the BIM as necessary and deletes the relevant entry from the reservation table.

Reservation Message Transmission

To make a reservation, the reservation message transmission process 62 generates a reservation initiation message (RIM) the contents of which include the above described reservation BIM (RBIM), proposed start time (PST), proposed end time (PET), and RIM ID.

After the RIM is prepared, it is placed in the CSMA queue 16 for transmission, and a corresponding RIM table entry is created. Note that the reservation message transmission process 62 is only responsible for generating the initial RIM for a given reservation, and for creating a corresponding RIM table entry. The control message processing module 22 in FIG. 2 operates to complete the reservation process once it has been started, and to maintain the RIM table entries during the reservation process.

Control Message Processing

The control message processing module 22 in FIG. 2 is configured to process DCMs and, as mentioned, to complete reservations. All received DCMs are placed into the DCM receive queue 20 in FIG. 2.

Figure 6:
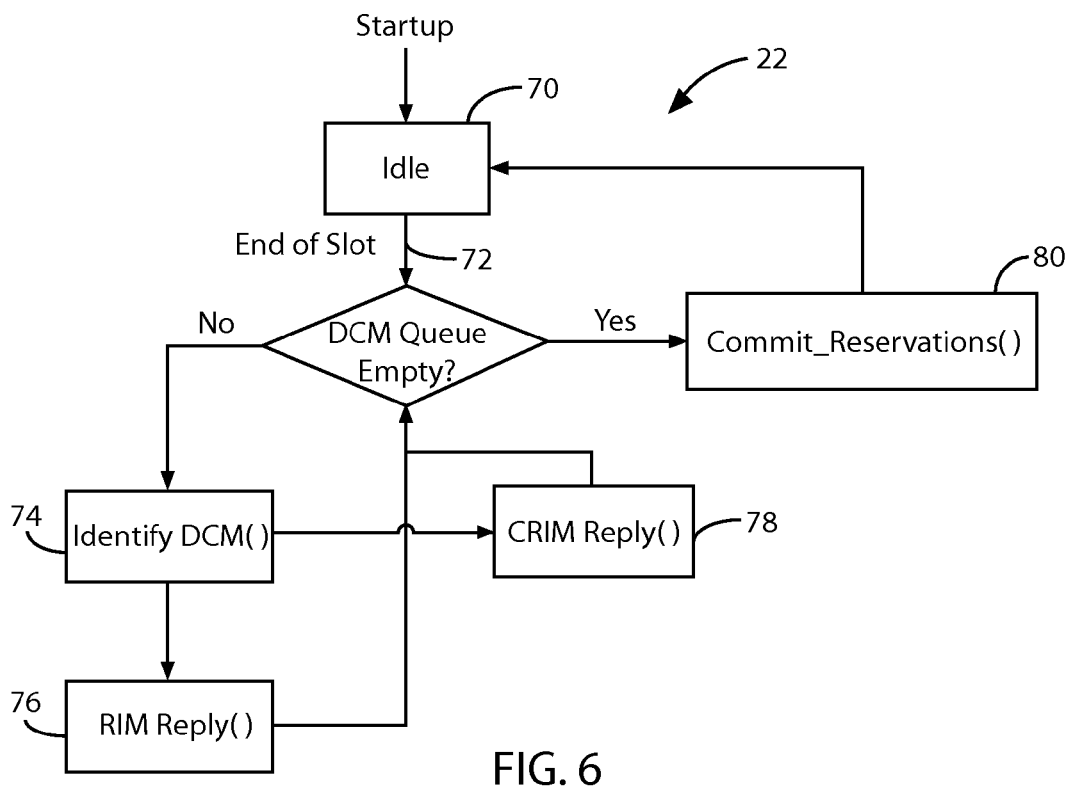
FIG. 6 is a block diagram of a control message processing module in FIG. 2.

As seen in FIG. 6, control message processing is normally at idle 70. When at idle, the process puts itself to sleep until an end of slot 72 is determined, at which time the process wakes up and processes all received DCMs (if any) and finalizes any existing reservations. The functions represented in FIG. 6 are explained below:

Identify_DCM( ) 74: Dequeues from the DCM receive queue 20 (FIG. 2) and, depending on whether the resulting DCM is a RIM or a CRIM message, calls either RIM_reply( ) 76 or CRIM_reply( ) 78.

RIM_reply( ) 76: The receiving node examines the received RIM message and creates a RIM table entry if necessary with the specified RIM table fields. If, after examining its own BIM and EBIM tables, a node determines it has a conflict with the RIM, it sends a CRIM message in reply by placing the message into the CSMA queue 16. The node inserts a copy of its own BIM into the free BIM (FBIM) portion of the CRIM message, so that the RIM transmitter can narrow its choice of slots appropriately. Note that it is possible to receive a RIM whose ID matches that of a RIM to which the receiving node has already created a responsive CRIM message, but had no opportunity to transmit. If a RIM message is received and a corresponding CRIM message still resides in the CSMA queue, the CRIM message is preferably deleted and the newly received RIM dealt with from scratch.

CRIM_reply( )78: The receiving node examines the received CRIM message, and uses the FBIM portion of the message to regenerate a RIM for transmission via the CSMA queue 16 in FIGS. 1 and 2. Note that the node must check the CSMA queue 16 for outgoing RIM messages that are relevant to the CRIM it has received, since it is possible to receive multiple CRIM responses to a given RIM. When this occurs, the outgoing RIM must be removed from the CSMA queue 16 and updates must be made to it after taking into account the information contained in the FBIM portion of the newly received CRIM message.

Commit_reservations( ) 80: Checks the RIM table for reservations whose PSTs have arrived. All reservations whose PSTs have arrived are written into the BIM and an appropriate entry is added to the reservation table.

As described herein, the DASH protocol offers significant advantages over existing ad hoc reservation mechanisms such as, e.g., IEEE 802.11 with RTS/CTS. DASH allows a given radio or node to negotiate for and reserve network resources, and protects scheduled transmissions from collisions with transmissions from nodes outside the sensing range of the given node. The reservations may be made on a long term basis so that any overhead incurred by the reservation process is amortized over time. Unused bandwidth is distributed adaptively and safely to nodes requiring it more than others, and bandwidth is recovered each time a node releases a previous reservation it no longer needs or when a node moves outside transmission range. The nodes can operate effectively using simple omnidirectional antennas, while still allowing for an appreciable degree of spatial reuse within the network.

Although the DASH protocol may not be optimal timewise for relatively short transmissions, it can cooperate with DMAC which can handle such transmissions more efficiently. And because the DASH reservation decision process is distributed among a number of radios, there is no potential single point of failure.

The DMAC Protocol (FIGS. 7 to 24)

DMAC Frame and Time Slot Structure

The inventive DMAC protocol embodies the concept of network frames wherein each frame is defined by a series of time slots of known duration. The slots in each frame are scheduled for data transmission using the described NAMA, DASH and CSMA/CA protocols, and serve to implement the following three network operations:

1. Network entry (NE): One slot per frame is used for transmitting a network entry beacon signal, so as to enable new radios or nodes to establish their presence and become members of the network.

2. TDMA: A number of slots in a given frame are used for transmission of data packets that have been scheduled under NAMA.

3. Reservation: A number of slots in a given frame are available for reservations obtained under DASH. Among the defined reservation slots in each frame, any slots for which there are no existing reservations become available for contention access (CSMA/CA).

The time slots in each frame are managed by a DMAC scheduler in order to distribute the slots to network radios or nodes that need them. In the case of TDMA slots, slot ownership is designated by a deterministic hashing mechanism following the NAMA protocol. For the reservation slots, the DASH protocol is used to allocate available reservation slots to nodes that request them. The ratio of the actual number of slots available for a given type of message to the total number of slots per frame, may be pre-configured or adjusted dynamically to suit changing network conditions.

The DMAC frame structure may be organized using two separate slot tables. The tables are:

1. Serialized frame (see FIGS. 8 and 10): An array that contains the above three slot types (NE, TDMA, and Reservation) represented in serial blocks. Scheduling is performed by manipulating the array.

2. Slot schedule (see FIG. 10): An actual schedule that is followed as transmissions occur. A frame hasher is used to distribute the slots randomly in the serialized frame in a deterministic fashion (much like NAMA hashing) so that the entire network follows the same schedule.

Control and Processing Overhead

To control operational overhead, DMAC uses both NAMA and DASH bandwidth reservation mechanisms to minimize transmission overhead. NAMA generates no scheduling overhead because of its hashing characteristics. And because DASH uses a NAK-based negotiation process to minimize the number of messages needed to reserve time slots for transmission, it only requires transmission of relatively short bit strings representing DMAC frames.

Concerning processing overhead, NAMA hashing is reduced essentially to a round robin scheme to minimize processor utilization. Even implementations using a hash that generates a random distribution of results may be used with minimal processing power per hash calculation. When used in a small network, hashing overhead can be efficiently controlled. Similarly, DASH does not require a large amount of processing power.

Queuing decisions under DMAC require relatively simple comparison, conditional, and summing operations that do not consume a large number of processor cycles. While DMAC queues require memory to implement, the queues may be configurable depending on how much memory is available. DMAC is adaptable to work under a wide range of memory limitations.

DMAC Logical Structure

Figure 7:
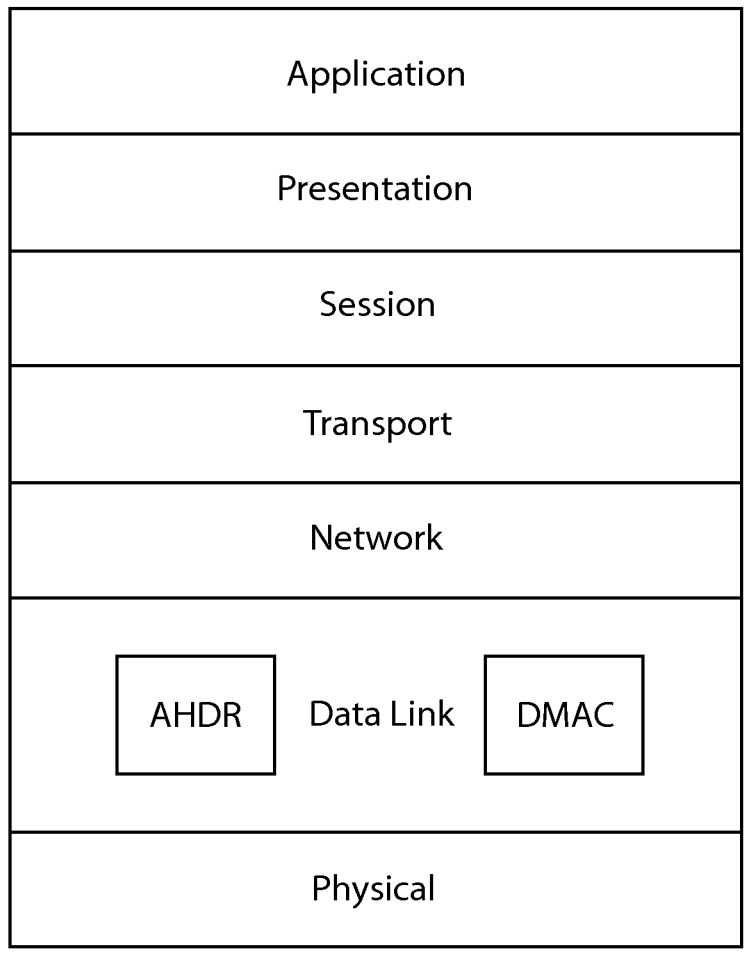
FIG. 7 shows a number of network layers provided in a network radio or node operating with the inventive DMAC protocol.
Figure 8:
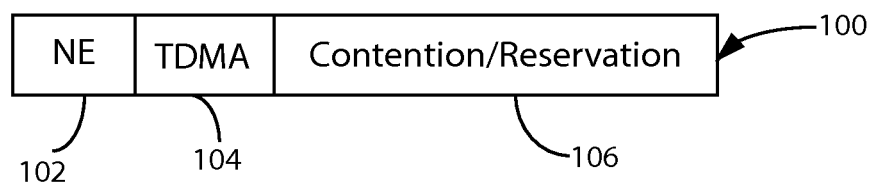
FIG. 8 shows a network time frame according to the invention.

Stack Architecture (FIG. 7)

DMAC requires each network radio to have or acquire knowledge of neighbor radios within two-hop range, and routes to radios that are two or more hops distant at any given time. Such information may be obtained via a MANET topology protocol disclosed in commonly owned U.S. patent application Ser. No. 11/546,783 filed Oct. 12, 2006, (now U.S. Pat. No. 7,656,851 issued Feb. 2, 2010) and referred to as adaptive hybrid domain routing or AHDR. All relevant portions of the '783 application '851 U.S. patent are incorporated by reference. Other currently available topology protocols may also be used.

As seen in FIG. 7, both DMAC and the selected topology software are preferably inserted at the data link layer of the OSI network stack, thus allowing DMAC to call for topology information when needed, and to provide the topology software with access control routines it may need to maintain routing and topology tables.

Frame Structure

As noted, DMAC frames follow a slot schedule that defines the distribution of slots in a given frame. A DMAC serialized frame 100 is shown on in FIG. 8. Frame 100 is defined by three blocks of time slots. A first block 102 is the network entry (NE) slot used for transmission of network entry beacon signals, coarse time synchronization, and other network entry routines for recognizing new radios or nodes seeking to enter the network. A second block 104 contains a number of the TDMA time slots for message or traffic data to be transmitted under the NAMA protocol. A third block 106 contains a number of the reservation time slots for traffic to be transmitted under DASH, or by using CSMA/CA during those slots for which no current reservation exists. Unreserved slots in the reservation block 106 are also available for negotiation of future reservations under DASH.

Tailored resource queue managers (see FIG. 9) build their schedules based on the serialized blocks 102, 104, 106 of time slots in order to simplify the organization and distribution of the slots. This makes the task of keeping track of the different types of slots less complicated as slots are used or reserved. The frame hasher (see FIG. 10) creates links to the interlaced slot schedule which governs actual transmissions.

DMAC Logic Blocks

Figure 9:
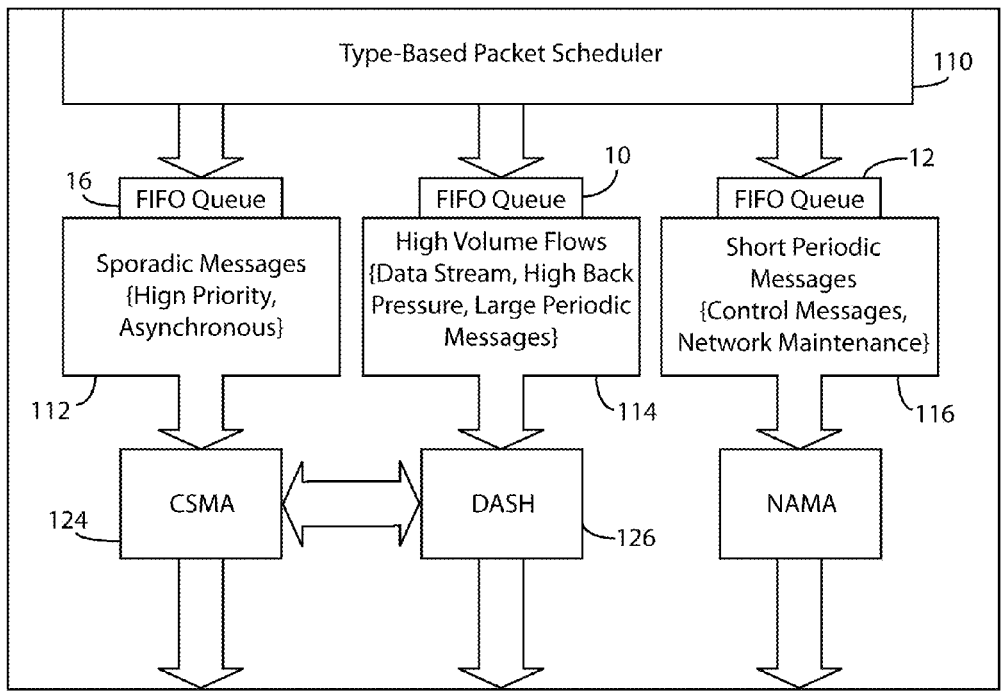
FIG. 9 shows a configuration of processor and memory modules in the network radio.
Figure 10:
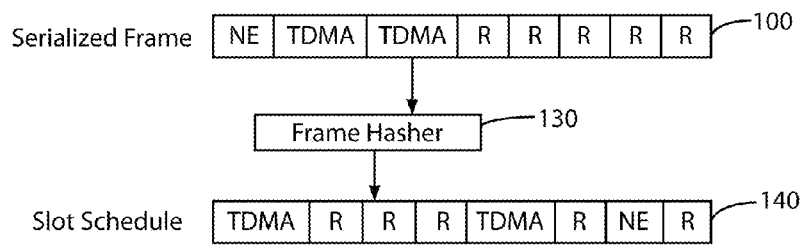
FIG. 10 illustrates the formation of a slot schedule from the network time frame.

The decision-making processes of DMAC are implemented by three basic logic blocks, namely, a type-based packet scheduler 110 shown in FIG. 9, resource queue managers 112, 114, 116, and a frame hasher 130 shown in FIG. 10.

Type-based Packet Scheduler 110

The scheduler 110 is configured to separate outgoing messages into the three transmission sub-queues 10, 12, 16 (FIG. 1) to allow the corresponding queue managers to assume control of a given outbound message for transmission. Based on the type of outbound message, the message is queued into one of the three sub-queues 10, 12, 16. Each sub-queue is managed by the protocol associated with the type of messages it holds. A CSMA module 124 and a DASH module 126 are shown in FIG. 9 with an interconnecting arrow because their operations may be linked and bridging of packets may be allowed between the two modules 124, 126.

Tailored Resource Queue Managers

The resource queue managers 112, 114, 116, conform with the different transmission processes for the different types of outbound messages. Specifically;

Contention (queue manager 112): CSMA/CA is implemented as a simple carrier sensing protocol that uses a known mechanism such as a distributed coordination function (DCT) for collision avoidance (e.g., IEEE §802.11 without RTS/CTS).

Reservation (queue manager 114): DASH makes reservations for future transmissions using currently unreserved reservation slots.

TDMA (queue manager 116): NAMA is used for the distribution of TDMA time slots among the network nodes.
Frame Hasher 130 (FIG. 10)

The frame hasher 130 creates links from the serialized frame 100 to a slot schedule 140 to generate a usable frame for transmission. To reduce coordination overhead, a deterministic hash is used that always yields the same result when given the same seed. Thus, other network nodes only need to obtain the frame hasher seed upon network entry in order to synchronize their slot schedule 140 with the rest of the network. This reduces communication overhead but still allows for dynamism in the schedule if the hasher seed is made a variable parameter that changes at known times.

DMAC Functionality

Figure 11:
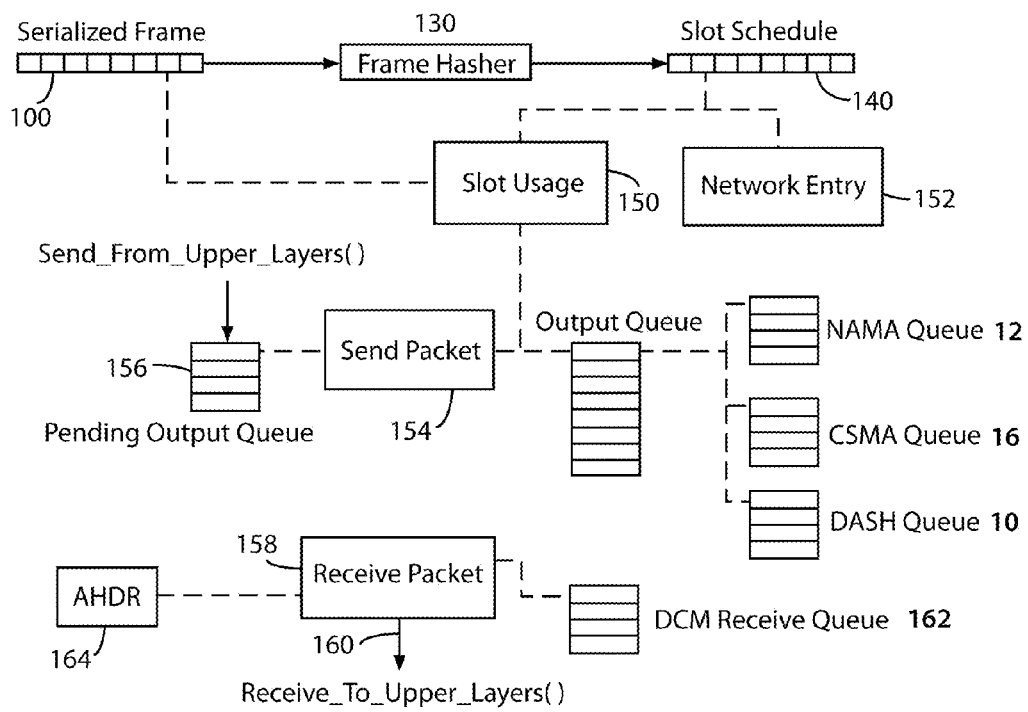
FIG. 11 illustrates a process of preparing messages or traffic for transmission from the radio.

FIG. 11 is an overview of the DMAC processes which include the following:

1. Slot usage 150: This governs actual usage of the slot schedule 140 (FIG. 10) after the schedule is generated. It manages transmissions as slots arrive by checking the slot schedule 140 to determine which protocol (NAMA, DASH or CSMA) should have control over each transmission. The process preferably runs continuously without having to be actively invoked after start up.

2. Network entry 152: The process of maintaining network membership. It runs on its own, and is in charge of helping new nodes to enter the network. This portion of the serialized frame 100 is used to allow new nodes, for example, to listen for network identification signals transmitted by certain existing network nodes and to announce themselves as seeking network entry.

3. Send packet 154: The type-based packet scheduler 110 takes data packets from a pending output queue 156 and prepares them for transmission via a corresponding one of the resource queues 10, 12, 16 in FIG. 9.

4. Receive packet 158: Receives packets sent from other network nodes. Depending on the type of packet, the process either passes it to upper layers (at 160), adds it to a DASH control message (DCM) receive queue 162, or sends it to an existing network topology module (e.g., AHDR) 164 in the radio.

5. Frame generation: Generation of the slot schedule 140 by the frame hasher 130 using the serialized frame 100.

Frame Generation

Serialized Frame 100

Each serialized frame 100 is configured to enable the network entry process 152 on a periodic basis, for example, once every second or other unit of time depending on network requirements. This may cause the number of slots per frame to change according to connection speed and packet size per slot. Assuming 500 byte packets and an 11 Mbps IEEE 802.11b connection, the serialized frame 100 may contain the following numbers of time slots in each block:

| Block | Number of slots |
| --- | --- |
| 102 (NE) | 1 |
| 104 (TDMA) | 500 |
| 106 (Reserved/Contention) | 2000 |

The serialized frame 100 is preferably stored in memory as an integer array and contains the following:
NE block 102
TDMA block 104: NAMA determined transmitter IDs.
Reserved/Contention block 106: DASH/CSMA status. Reserved slots are slots marked as reserved under DASH. Unreserved slots comprise all slots unmarked by DASH and are designated as CSMA-accessible slots. Hereafter, "DASH slots" refers to time slots within the reserved/contention block 106 that have been scheduled by DASH, and "CSMA slots" refers to time slots within the block 106 that have not been scheduled by DASH.
Frame Hasher 130

Figure 12:
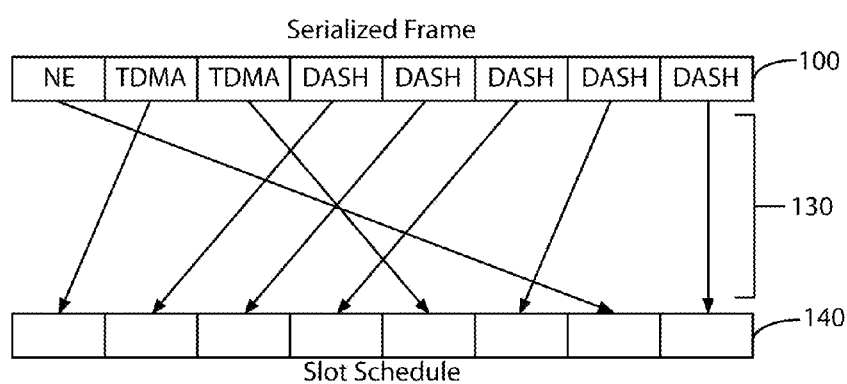
FIG. 12 shows an example of the formation of the slot schedule in the radio.

As shown in FIG. 12, frame hasher 130 is used infrequently to create links leading from the serialized frame 100 to the slot schedule 140. The hasher 130 can be regarded as merely a hash function that deterministically randomizes the order of the individual slots in the serialized frame 100. Slots of the same type remain in their original temporal order, but the spacing between them may change to allow other types of slots to be interleaved among them as seen in FIG. 12.

Assuming all network nodes use the same deterministic hash, they will all arrive at the same linking order given the same inputs. As mentioned, this reduces network overhead in the creation of the slot schedule 140 and in frame synchronization among the network radios.

Figure 13:
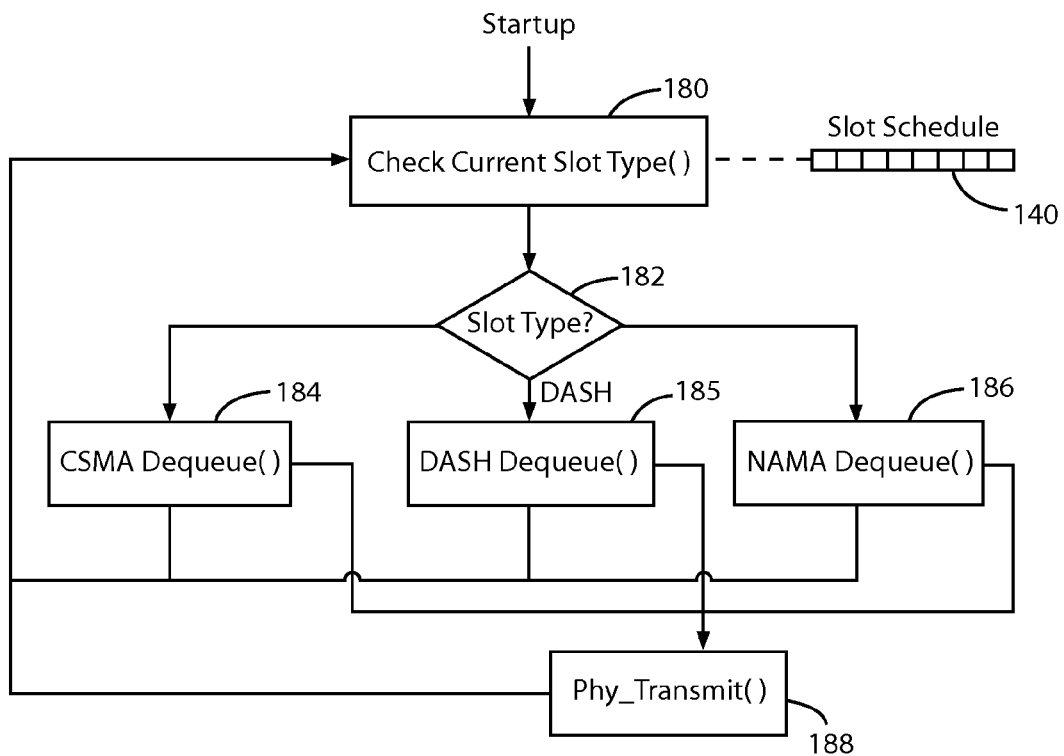
FIG. 13 illustrates a process of determining which of three different access protocols is selected for transmission of traffic from the radio during time slots in the slot schedule.

Slot Usage (FIG. 13)

As noted above, the order of slots within the slot schedule 140 is determined by links from corresponding slots of the serialized frame 100. See FIG. 12. Thus, as shown at step 180 in FIG. 13, the slot schedule 140 is consulted, and the type of data for which a current slot has been allocated is determined at step 182. Depending on the type of data to be transmitted during the current slot, the corresponding tailored resource queue manager 112, 114 or 116 is activated to assume control of the data transmission.

The processes shown in FIG. 13 are as follows:

Check_Current_Slot_Type( ) 180: All relevant information is retrieved using the link in the slot schedule index corresponding to a current slot. A decision is then made whether to call CSMA_Dequeue( ) 184, DASH_Dequeue( ) 185, or NAMA_Dequeue( ) 186.

CSMA_Dequeue( ) 184: The CSMA queue 16 (FIG. 1) is checked. If the queue is not empty and sufficient time remains in the slot to make a transmission, the link to the first packet in the CSMA queue is removed, and the corresponding data packet is taken from the output queue 18 and passed to Phy_Transmit( ) 188 for transmission from the radio. If the CSMA Queue 16 is empty, then CSMA_Dequeue( ) 184 waits until a packet is added, or End of Slot (EOS) arrives before completing. The process 184 calls Check_Current_Slot_Type( ) 180 before it returns.

DASH_Dequeue( ) 185: The DASH queue 10 (FIG. 1) is checked. If the queue is not empty and sufficient time remains in the slot to make a transmission, the link to the first packet in the DASH queue is removed, and the corresponding data packet is taken from the output queue 18 and passed to Phy_Transmit( ) 188 for transmission from the radio. If the DASH Queue 10 is empty, then DASH_Dequeue( ) 185 waits until a packet is added, or End of Slot (EOS) arrives before completing. The process 185 calls Check_Current_Slot_Type( ) 180 before it returns.

NAMA_Dequeue( ) 186: The NAMA queue 12 (FIG. 1) is checked. If the queue is not empty and sufficient time remains in the slot to make a transmission, a check is performed to see if the radio has NAMA transmit rights. If so, a check is made to see if a BIM update has been sent out during this NAMA slot. If a BIM has not been sent out, the BIM is prepared for transmission and passed to Phy_Transmit( ) 188. If the BIM has already been sent, the link to the first packet in the NAMA queue 12 is removed, and the corresponding data packet is taken from the output queue 18 and passed to Phy_Transmit( ) 188. If the NAMA Queue 12 is empty, then NAMA_Dequeue( ) 186 waits until a packet is added, or End of Slot (EOS) arrives before completing The process 186 calls Check_Current_Slot_Type( ) 180 before it returns.

Phy_Transmit( ) 188: Transmits packets passed to it by the CSMA, the DASH and the NAMA Dequeue( ) processes 184, 185 and 186, by forwarding the packets to the radio's physical layer (PHY).

Figure 14:
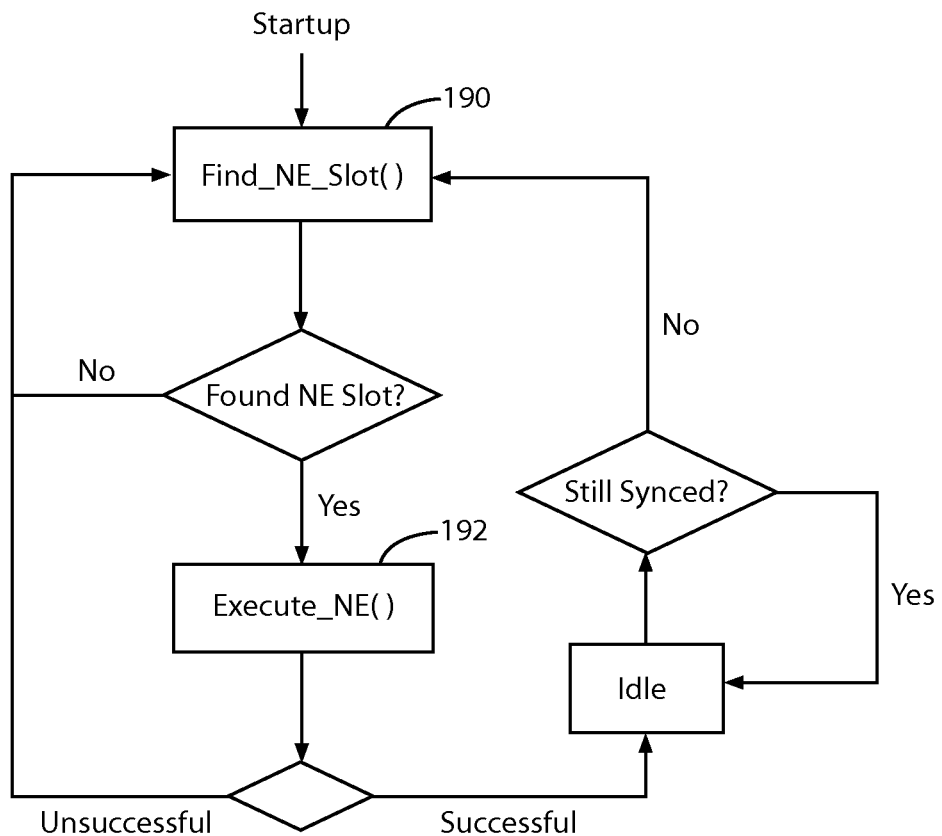
FIG. 14 represents a process of entering the network by the radio.

Network Entry (FIG. 14)

As mentioned, the network entry (NE) slot 102 (FIGS. 8 & 10) is provided for allowing new radios to enter the network. To facilitate entry opportunities, a network entry beacon message including a system time announcement can be transmitted during the slot 102. For example, the beacon transmitter may be the same node as one that has been deployed to serve as a network time lead in the covered area. After receiving the beacon message, a new radio can attempt network entry using, e.g., standard CSMA/CA protocol. The process for a new radio attempting network entry is represented by the following steps in FIG. 14;

Find_NE_Slot( ) 190: The radio awaits the network entry beacon message while not in sync. This may not be a function in the strict sense, and could be implemented as an interrupt as well.

Execute_NE( ) 192: The radio obtains a coarse synchronization through a system time variable contained in the network entry beacon message. Fine synchronization is obtained through further negotiation, and network topology (e.g., AHDR) information is then exchanged.

Figure 15:
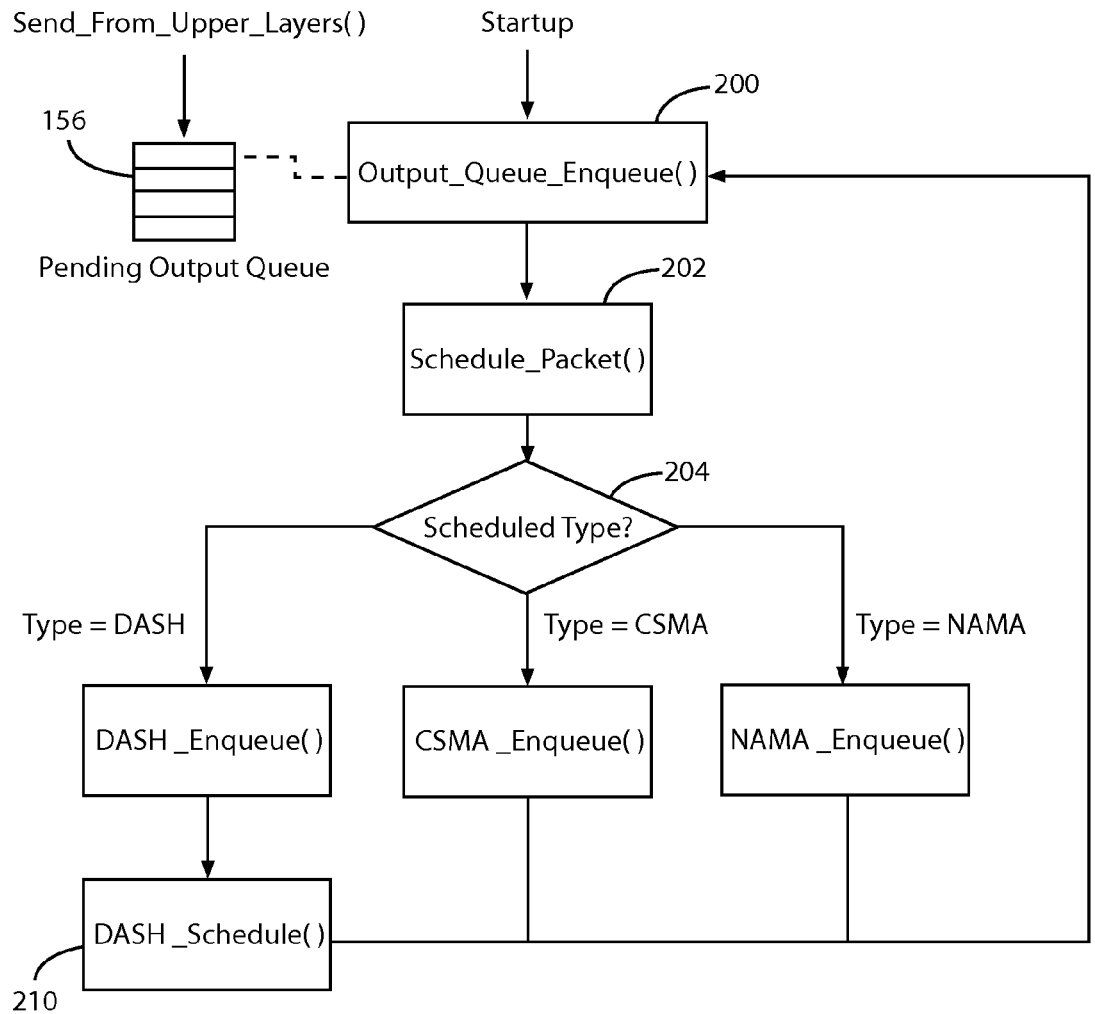
FIG. 15 illustrates a process of scheduling traffic for transmission from the radio.
Figure 16:
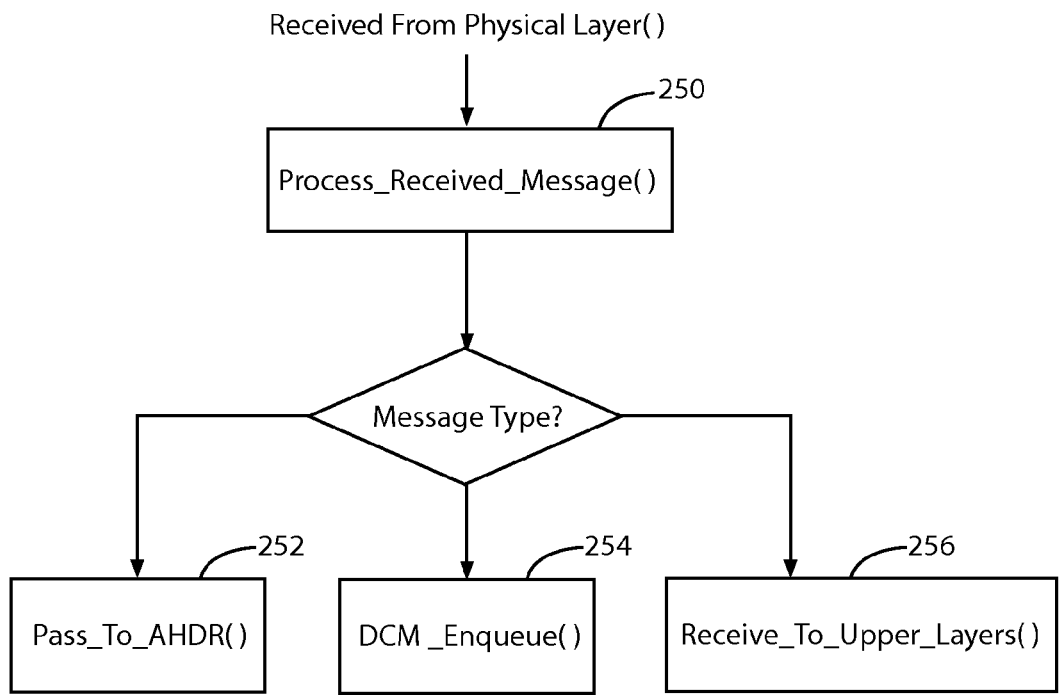
FIG. 16 shows a process of handling received messages or traffic at the radio.

Type-Based Packet Scheduler 110 (FIGS. 9, 15 and 16)

Queue Organization

A total of five queues combine to form a queuing structure for handling outgoing data packets. The queues include the pending output queue 156 (FIG. 11), the overall output queue 18 and the three tailored resource queues 10, 12 and 16 in FIG. 1. Pending output queue 156 may be a standard FIFO queue configured to hold data packets originating from upper network layers in a given a radio temporarily, before the packets are sorted and placed in the output queue 18. Output queue 18 is arranged to contain all outbound data packets that can be added or removed either in a standard FIFO manner, or through a dequeue function that removes a specific element.

The tailored resource queues 10, 12, and 16 in FIG. 1 may also be standard FIFO queues configured to contain links to actual entries in the output queue 18. Thus, the union of all links contained in the resource queues 10, 12, 16, should include no more than all the items in the output queue 18. All the queues should be set to a reasonable length in accordance with local memory resources and expected transmission rates.

Another queue, DCM receive queue 20 in FIG. 2, may be used for DASH control messages (DCM) on the receive side. Any received DCM messages would then await serving under the DASH protocol as described earlier above.

Queue Usage (FIG. 15)

During use, all queues should be carefully managed to maintain proper queuing coherence. In the enqueue process of FIG. 15, once a data packet becomes available for transmission, it is first placed in the pending output queue 156 prior to enqueue in output queue 18 (at step 200). The packet is then scheduled (step 202) using a type-based packet scheduler process (step 204) for enqueue in the corresponding resource queue 10, 12 or 16. The pending output queue 156 thus allows the enqueue process for output queue 18 to take advantage of a blocking dequeue call from the queue 156 to save processor time.

In FIG. 15, Output_Queue_Enqueue( ) 200 waits for an entry to be added into the pending output queue 156. When a packet is received from the pending output queue 156, Output_Queue_Enqueue( ) 200 adds the packet to the output queue 18 before allowing Schedule_Packet( ) 202 to decide which type of enqueue function or protocol (DASH, CSMA or NAMA) to use. See Table 1, below.

TABLE 1

| Transmission Protocol | Contention (CSMA) | TDMA (NAMA) | Reservation (DASH) |
| --- | --- | --- | --- |
| Advantages | Low Latency, no set up necessary. | Contention Free, ideal for network maintenance messages. | Allows dynamic bandwidth allocation and uneven on-the-fly bandwidth distribution. |
| Disadvantages | Contention Collapse, CSMA overhead lowers efficiency. | Difficult to add dynamism, requires time syncing, and allows for wastefulness if allocated slots go unused. | Making reservations requires a large amount of effort and time. |

Protocol Unification

According to the inventive DMAC protocol, the type of message traffic (Network Entry, High Priority, Periodic/Control/Management, or Flow) to be sent from a given radio or node is handled by selecting the transmission protocol most adept at handling the particular type of traffic.

In the case of CSMA, to preserve low latency and prevent contention collapse, only relatively low traffic volume, i.e., network entry and short high priority messages are allowed during the CSMA time allocations.

For TDMA, traffic is limited to data that is transmitted on a periodic basis such as network control/maintenance and periodic broadcast messages. As a result, the TDMA slots (assigned by NAMA) are not wasted because data is always available for transmission.

The reservation slots are used for the negotiation (under DASH) of long term transmissions facilitated by high volume flows and high back pressure buildups. The cost of scheduling becomes amortized over the lifetime of the scheduled transmission.

In essence, DMAC operates like a complex queue organizer. Outgoing messages are split into message types and directed to reside in the corresponding queues, and the three transmission modules (CSMA, NAMA and DASH) perform their respective tasks during their assigned slots per the slot schedule to empty the queues.

Specifically, in FIG. 15;

1. Schedule_Packet( ) 202: Determines if a packet originates from the network topology application (e.g., AHDR) in the radio. If so, the packet is sent to the NAMA queue 12. If not, the overall size of the output queue 18 is checked.

If the size of output queue 18 exceeds a predetermined backpressure threshold, the new outgoing packet is placed in the DASH queue 10 for service by DASH. In addition, the entire CSMA queue 16 is transferred over to the DASH queue 10, and DASH scheduling is run on the newly enqueued packets.

If the size of the output queue 18 is below the backpressure threshold, the outgoing packet is added to the CSMA queue 16.

2. DASH_Schedule( ) 210: Uses the DASH protocol to schedule a transmission time for a freshly enqueued data packet.

Tailored Resource Queue Managers

The functionality of the tailored resource queue managers 112, 114, 116, resides in their enqueue and dequeue operations, as follows:

DASH Queue 10: DASH reservations are made during the enqueue process. The DASH resource queue manager 114 is in charge of maintaining proper tagging of reserved and unreserved slots within the serialized frame 100. As DASH reservations are created or expire, the serialized frame 100 must reflect this accordingly.

NAMA Queue 12: NAMA transmission determinations are made during normal slot operation as described above.

CSMA Queue 16: CSMA does not actually reserve. It simply transmits as soon as it has an opportunity, provided there are contents in the CSMA queue 16.

Receive Packet

When a packet is received by a radio, it is handled by DMAC as shown in FIG. 16. Process_Received_Message( ) 250 determines the type of incoming message, and performs one of the following three actions:

1. Pass_to_AHDR( ) 252: Sends the message to AHDR or other resident network topology application for processing.

2. DCM_Enqueue( ) 254: Enqueues a received DASH control message (DCM) to the DCM queue 20 (FIG. 2).

3. Receive_To_Upper_Layers( ) 256: Sends the packet to upper network layers in the radio.

To determine a message type, Process_Received_Message( ) 250 may check the message format, for example;

AHDR: Check for existence of an AHDR header.

DCM: Check if the message has a UDP format and is destined for a specified control message port.

Upper layers: Any message that is not determined to be of the AHDR or the DCM type.

Time Synchronization

Two types of synchronization are provided in the present embodiment of DMAC, namely;

1. Coarse synchronization: This is the accuracy acquired by a radio when decoding a network entry beacon message upon entering the network. This level of accuracy may not be sufficient because of transmission delays, and should be adjusted by fine synchronization to be usable.

2. Fine synchronization: This provides the radio with the required time sync granularity to maintain accurate communications with other radios in the network. Fine synchronization may be obtained only after the radio gains coarse synchronization.

Interface to Upper Layers

To maintain transparency, the interface to the network layer above the data link layer (where DMAC preferably resides) in a given radio is preserved, and only outbound and incoming data packets are allowed to pass. Note that all AHDR or other resident topology software interactions are maintained within the data link layer, and are not considered as interlayer communications.

Interface to Physical Layer

Also, to maintain transparency, the physical (PHY) network layer is preferably called only when data is ready for immediate transmission from the radio. That is, a final call to the PHY layer is not made until a transmission is deemed necessary by the resource queue managers 112, 114, 116.

To differentiate DMAC messages from other types of messages when communicating with the PHY layer, all DMAC messages may be prefaced and formatted as UDP messages. In the present embodiment, DMAC messages refer to messages of the DASH control message (DCM) type. To differentiate among different types of DCMs, the messages may be addressed to specific ports such as shown, for example, in Table 2 below

TABLE 2

| Port Value | Message Type |
|---|---|
| 1010 | RIM |
| 1011 | CRIM |
| 1012 | BIM |

Simulation Results

To evaluate performance, the DMAC protocol was simulated using an available, event-driven simulation tool known as Mission Level Designer (MLD). The tool allows a user to customize scenarios and network components as needed. DMAC was simulated using a simple, single-channel, half-duplex radio across a network of up to twenty nodes, and an 11 Mbps transmission channel.

A. Scenarios

Three increasingly complex tactical scenarios were explored. Aggregate throughput values were recorded using DMAC, and a pure CSMA/CA protocol. Note that when a broadcast packet is received, recorded aggregate throughput values are based on reception of the packet by all nodes within transmission range. The scenarios were intended to simulate an independent, multiple hop network under specific tactical conditions. Since squad operations entail predominately broadcast type transmissions for updating the squad with new developments on a regular basis, the traffic comprised 200 byte data packets. The three scenarios are illustrated in FIGS. 17, 18 and 19, and include a hidden terminal scenario (FIG. 17), a reconnaissance scenario (FIG. 18), and a five group scenario (FIG. 19).

Figure 17:
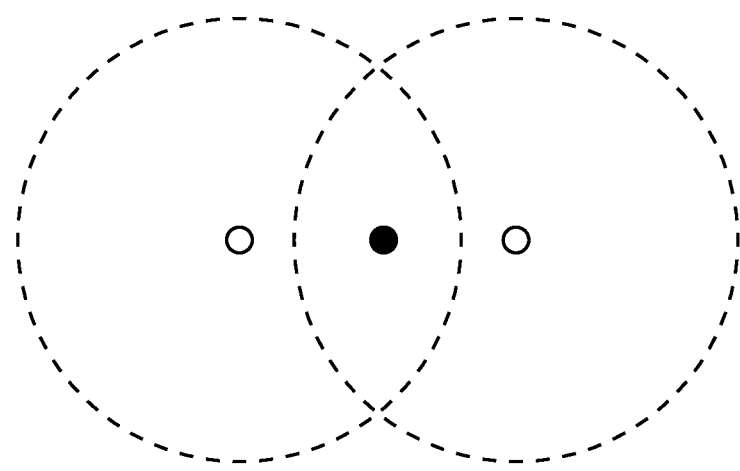
FIGS. 17 to 24 show results of simulations performed for radios or nodes operating with the inventive DMAC protocol.

FIG. 17 shows a three node hidden terminal situation, wherein the leftmost node in the figure began transmitting at a 125 KB/s rate immediately, and was then joined by the rightmost node three seconds later for a total simulation time of 10 seconds.

Figure 18:
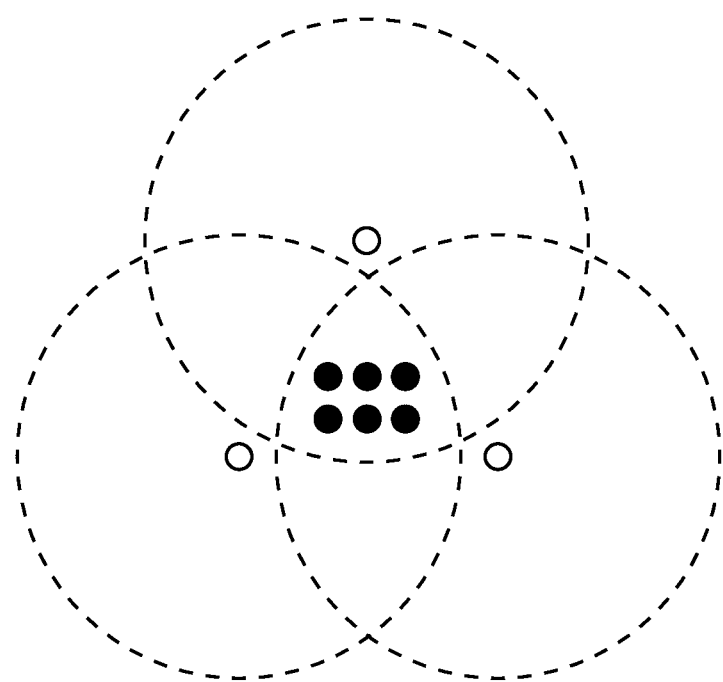
Figure 19:
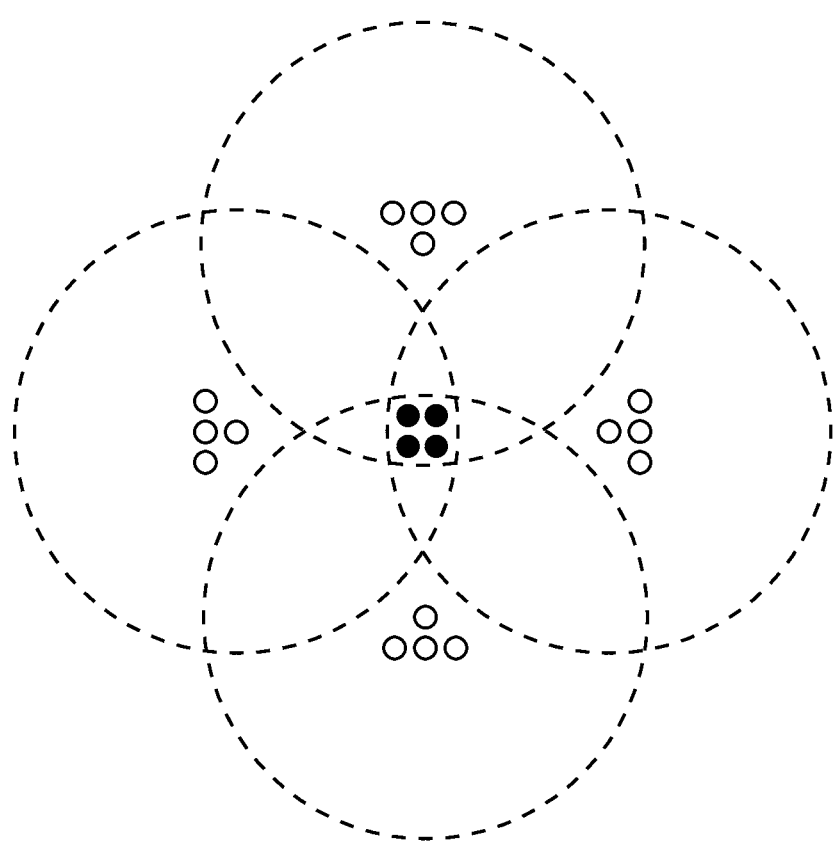
Figure 20:
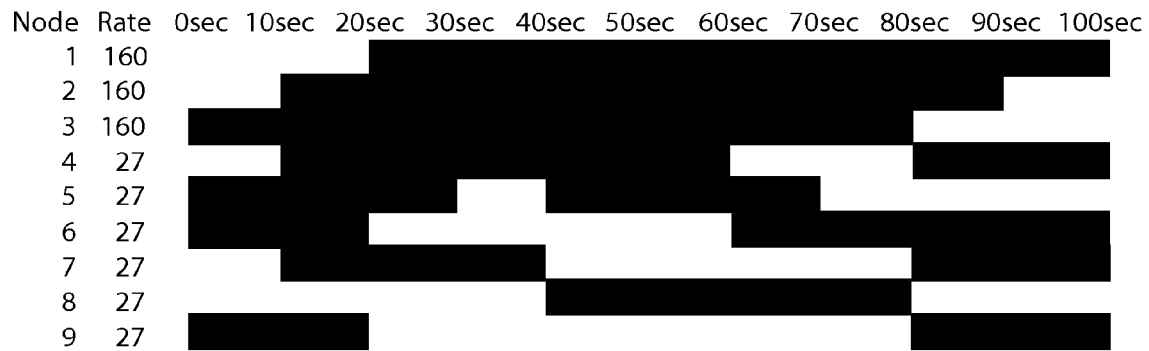

FIG. 18 models a squad formation with three reconnaissance units surrounding a main group. The reconnaissance units create a three-way hidden node conflict when transmitting high volume tactical data to the rest of the squad simultaneously. To make the traffic more interesting, packets were streamed according to the nodes, rates, and times shown in FIG. 20, wherein nodes 1 to 3 are the reconnaissance nodes, and nodes 4 to 9 are the main squad nodes. Rates are measured in kilobytes per second.

The traffic patterns were intended to emphasize the difference in performance of the network with and without hidden nodes. All traffic was placed in receive range at the beginning and the end of the scenario, so as to illustrate the effectiveness of CSMA/CA when carrier sensing is available. During the remainder of the scenario, however, the results show how badly CSMA/CA can be crippled when hidden node conflicts exist. Transient, smaller transmissions were included to model voice and other communications.

FIG. 19 represents a formation of units spread farther apart than in the scenario of FIG. 18. This scenario also highlights the ability of DMAC to scale successfully as the number of network nodes increases. The nodes are separated into five main groups, viz., a middle group, and four outside groups each located the same distance from a corresponding side of the middle group. Note that although the middle group is fully connected (in one hop range) to all other groups, each outside group can communicate only with the middle group, thus creating a scenario wherein the four groups are hidden from one another.

Figure 21:
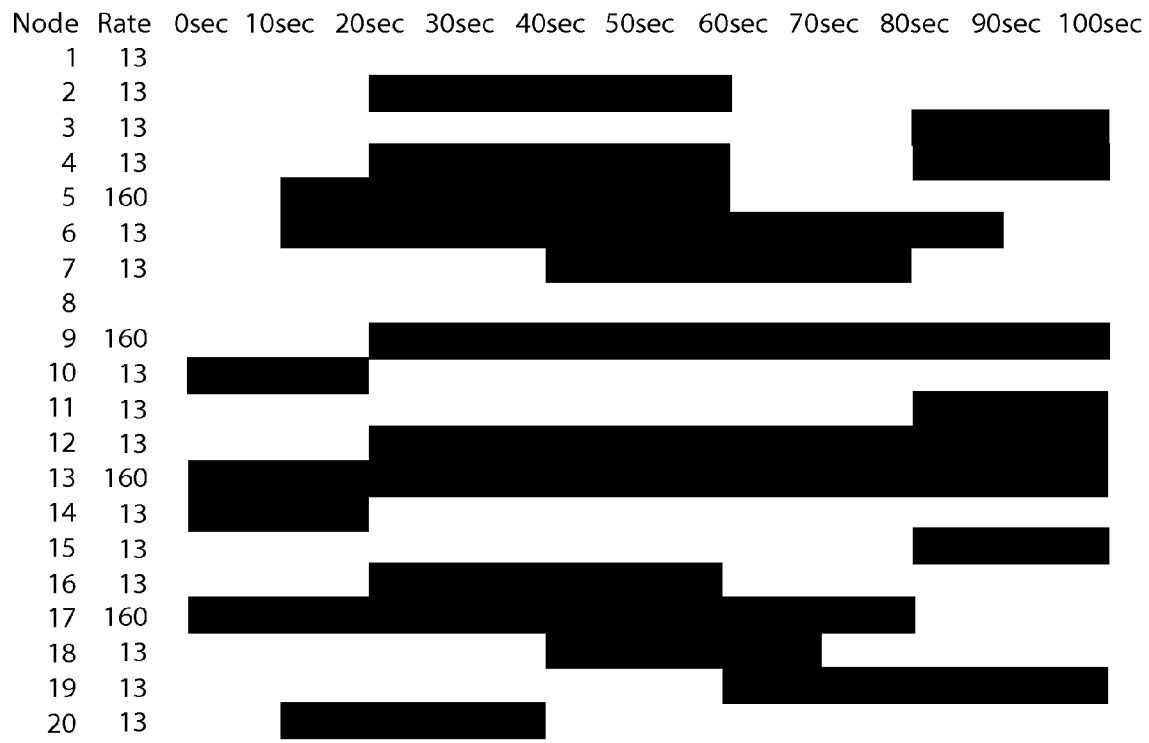

The nodes, rates and times of the traffic generated in this scenario are shown in FIG. 21, wherein nodes 1 to 4 are in the middle group, nodes 5 to 8 are in the right-hand group, nodes 9 to 12 are in the lower group, nodes 13 to 16 are in the left-hand group, and nodes 17 to 20 are in the upper group. The traffic in this scenario was intended to demonstrate operation of a larger network with four groups of hidden nodes transmitting simultaneously. There are four large data streams in FIG. 21 which simulate streaming of multimedia data. The smaller data streams simulate the flow of lower bitrate data.

B. Results

Figure 22:
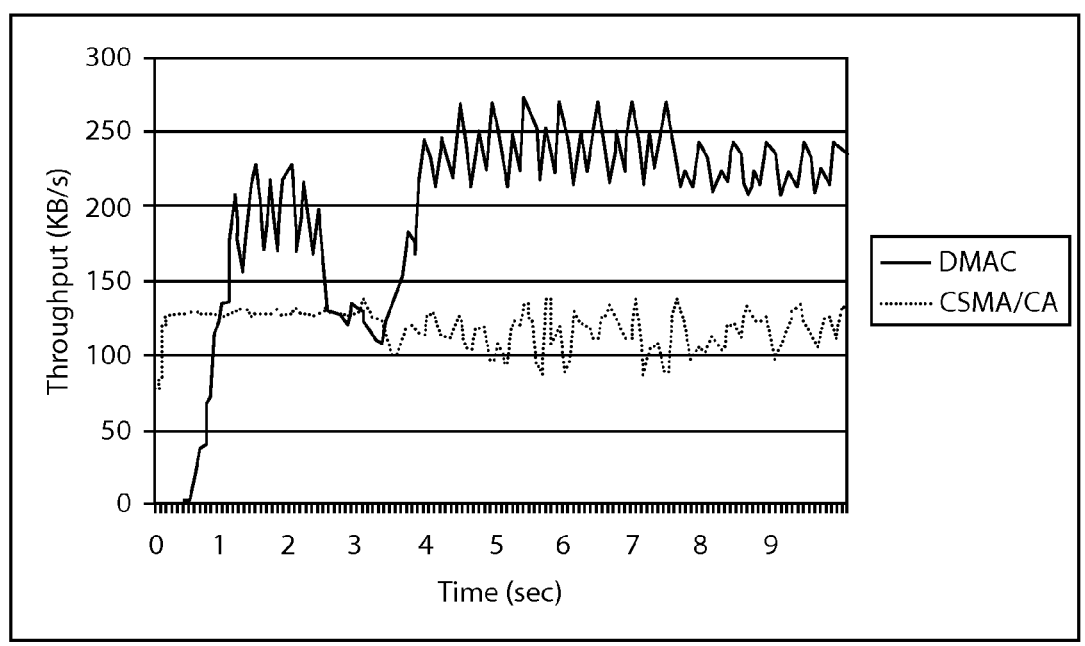
Figure 23:
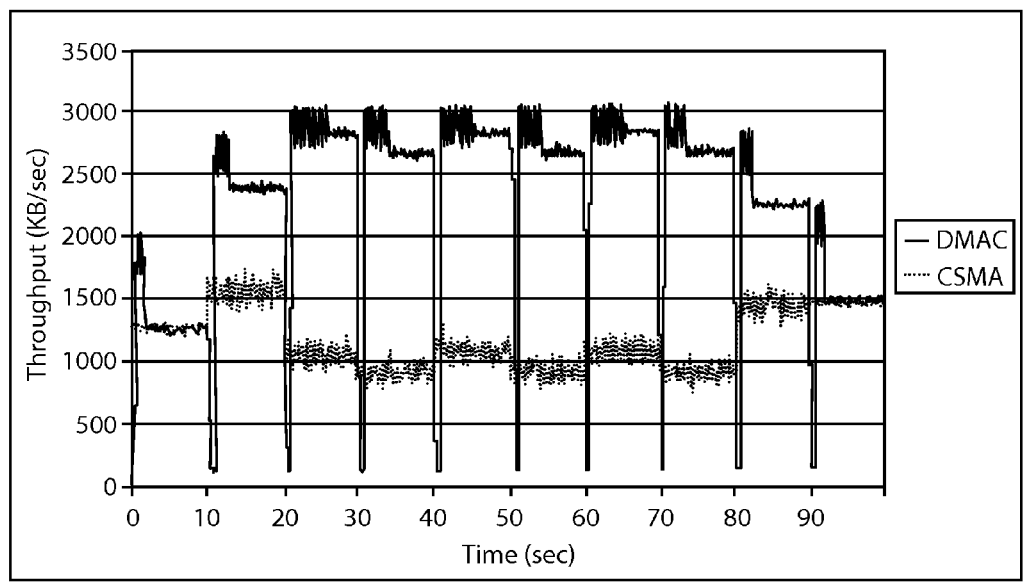
Figure 24:
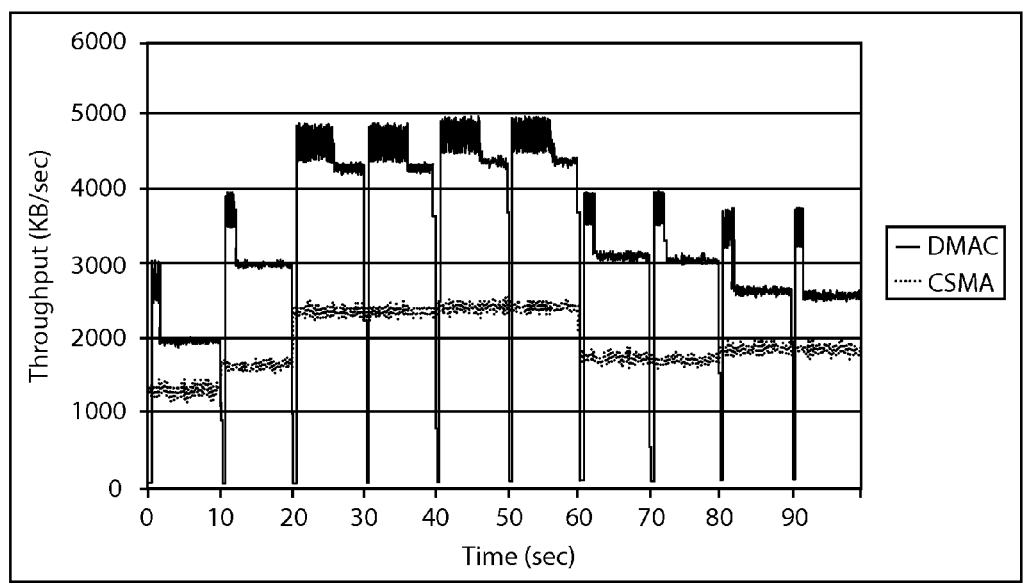

Simulation results for Scenarios 1-3 are shown in FIGS. 22, 23 and 24, respectively. Viewed as a whole, the results show DMAC and CSMA/CA in three different lights.

FIG. 22 reveals how DMAC and CSMA/CA perform on a most basic level when presented with a hidden node. Note that DMAC takes a short period of time to schedule its transmissions before ramping up to full transmission rates. Due to the ability of DMAC to work around a hidden node, it maintains a significantly higher throughput than CSMA/CA.

The second scenario results in FIG. 23 illustrate how DMAC and CSMA/CA perform as more hidden node transmissions come into play. As shown in FIG. 23, CSMA/CA was able to match the performance of DMAC during the first and the last ten seconds of the scenario because no hidden node conflicts were present. When a hidden terminal is introduced at the ten second mark, the difference between DMAC and CSMA/CA performance becomes apparent. The gap only intensifies at the 20 second mark when the third reconnaissance node begins its transmissions. The local jumps in throughput level can be attributed to smaller data flows that start and stop in the background.

FIG. 24 illustrates the performance of DMAC as the number of nodes in the network increases in the third scenario. Again, large main streams of traffic are present to simulate multimedia data flow, in addition to smaller streams that simulate other data types. As seen in FIG. 24, CSMA/CA performs much better on a system level because of local area receptions of data packets. Nodes in a given outside group cannot hear packets streaming from nodes in any of the other three outside groups, but are still able to receive packets sent from other nodes in the given group notwithstanding a large number of collisions in the middle group due to hidden nodes. Once again, DMAC's scheduling capabilities allow it to avoid the dangers of hidden nodes.

The results demonstrate that by simply adding relatively inexpensive processing power and memory to an existing carrier sensing handheld radio in order to implement DMAC, the capabilities and usefulness of the radio in tactical scenarios are greatly enhanced. DMAC obtains a significantly higher system throughput than CSMA/CA, both by avoiding collisions and by minimizing scheduling overhead.

By selectively handling different types of outbound messages with transmission protocols suited for each type of message, DMAC reduces the overhead and the complexity of coordinating channel access, and allows for agile portability while using distributed scheduling and traffic control to protect against hidden-nodes.

While the foregoing represents preferred embodiments of the invention, it will be understood by those skilled in the art that various modifications and changes may be made without departing from the spirit and scope of the invention, and that the invention includes all such modifications and changes as come within the bounds of the following claims.

We claim:

1. A method of transmitting messages or traffic from a radio or node for reception by one or more other nodes in a communications network, comprising:

generating a serialized network frame having first, second, and third blocks of time slots for the communications network, and providing a first time slot in the first block of time slots for allowing an outside node to enter the network;

the serialized network frame containing a number of second time slots of known duration in the second block of time slots for allowing a given node in the network to acquire medium access by assigning the node one or more of the second time slots in the second block of time slots according to a node access multiple access (NAMA) protocol;

the serialized network frame containing a number of third time slots of known duration in the third block of time slots for allowing the given node to acquire medium access by scheduling a set of one or more of the third time slots in the third block of time slots after the given node generates a corresponding reservation initiation message (RIM) requesting the set of third time slots and fails to receive a counter reservation initiation message (CRIM) from other nodes receiving the RIM representing a conflict with the requested set of third time slots;

wherein each of the other nodes receiving the RIM (a) determines which, if any, of the requested set of third time slots is reserved according to maps maintained by each of the RIM receiving nodes for identifying each of the third time slots as being either available or reserved, (b) transmits a CRIM to the given node if the RIM receiving node determines one or more of the requested set of third time slots are reserved, and (c) includes in the CRIM a map of third time slots known to be available, thus allowing the given node to request a revised set of third time slots for scheduling from among the time slots included in CRIMs received by the given node as being available;

configuring the given node to select a transmission protocol that is most adept at handling a given type of message or traffic from among (1) high volume streaming data including multimedia streams, voice, and high rate data streams, (2) sporadic messages including relatively small, unscheduled bursts of data, and (3) low volume periodic streams including network maintenance and control messages; and selecting, at the given node, the transmission protocol from among (i) using one or more of the second time slots assigned to the node in the second block of time slots, (ii) using one or more third time slots to be scheduled by the node in the third block of time slots, and (iii) acquiring medium access by contention during one or more third time slots for which no scheduled reservation exists in the third block of time slots.

2. The method of claim 1, including defining a slot schedule at a given network node for transmitting messages or traffic from the node, by interleaving time slots in the serialized network time frame among one another.

3. The method of claim 2, including maintaining the interleaved time slots in the slot schedule in the same sequence as the time slots in the serialized network frame.

4. The method of claim 1, including configuring the given node to acquire medium access during one or more of the third time slots in the third block of time slots for which no scheduled reservation exists by using a carrier sense multiple access (CSMA) protocol.

5. The method of claim 1, including configuring the outside node to enter the network by using a CSMA protocol during the first time slot in the first block of time slots.

6. A radio for communicating messages or traffic with other like radios in a network, comprising:

a first network layer including one or more processor and memory modules constructed and arranged for transmitting and receiving the messages or traffic to and from other like radios in a communications network having a serialized network frame including a first, a second, and a third block of time slots, wherein a first time slot is provided in the first block of time slots for allowing an outside radio to enter the network, a number of second time slots of known duration are contained in the second block of time slots, and a number of third time slots of known duration are contained in the third block of time slots;

a second network layer including one or more processor and memory modules configured to output messages or traffic to the first network layer for transmission from the radio according to a transmission protocol that is most adept at handling a given type of message or traffic from among (1) high volume streaming data including multimedia streams, voice, and high rate data streams, (2) sporadic messages including relatively small, unscheduled bursts of data, and (3) low volume periodic streams including network maintenance and control messages; and wherein the second network layer of the radio is configured to select the transmission protocol from among (i) using one or more second time slots in the second block of time slots that have been assigned to the radio according to a node access multiple access (NAMA) protocol, (ii) using a set of one or more third time slots in the third block of time slots that have been scheduled by the radio after the radio generates a corresponding reservation initiation message (RIM) requesting the set of third time slots and the radio fails to receive a counter reservation initiation message (CRIM) from the other radios receiving the RIM representing a conflict with the requested set of third time slots, and (iii) acquiring medium access by contention during one or more third time slots in the third block of time slots for which no scheduled reservation exists; and each of the other radios receiving the RIM is configured to (a) determine which, if any, of the requested set of third time slots is reserved according to maps maintained by each of the RIM receiving radios for identifying each of the third time slots as being either available or reserved, (b) transmit a CRIM to the RIM generating radio if the RIM receiving radio determines one or more of the requested set of third time slots are reserved, and (c) include in the CRIM a map of third time slots known by the RIM receiving radio to be available, thus allowing the RIM generating radio to request a revised set of third time slots for scheduling from among the time slots included in CRIMs received by the radio as being available.

7. A radio according to claim 6, wherein the processor and the memory modules are configured to define a slot schedule for transmitting messages or traffic from the radio, by interleaving time slots defined in the serialized network time frame among one another.

8. A radio according to claim 6, wherein the processor and the memory modules are configured to enable the radio to acquire medium access by using a carrier sense multiple access (CSMA) protocol during one or more of the third time slots in the third block of time slots for which no scheduled reservation exists.

9. A radio according to claim 6, wherein the processor and the memory modules are configured to enable the radio to enter the network by using a CSMA protocol during the first time slot in the first block of time slots in the network frame.

\* \* \* \* \*